(12) United States Patent
Fresk et al.

(10) Patent No.: US 6,421,135 B1
(45) Date of Patent: Jul. 16, 2002

(54) METHOD AND APPARATUS FOR ALLOWING A WALK-UP COPIER USER TO INTERRUPT A PRINT JOB AT A BOUNDARY

(75) Inventors: J. Sean Fresk, Eagle; Chris R. Gunning; Dellas G. Frederiksen, both of Boise, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/264,487

(22) Filed: Mar. 8, 1999

(51) Int. Cl.[7] .............................. G06F 13/00; G06F 3/12
(52) U.S. Cl. ...................... 358/1.15; 358/296; 358/1.13
(58) Field of Search ............................. 358/1.15, 1.13, 358/1.14, 1.16, 1.17, 296

(56) References Cited

U.S. PATENT DOCUMENTS

| | | | |
|---|---|---|---|
| 4,623,244 A | 11/1986 | Andrews et al. | 355/24 |
| 4,947,345 A | 8/1990 | Paradise et al. | 364/519 |
| 5,206,735 A | 4/1993 | Gauronski et al. | 358/296 |
| 5,299,296 A | 3/1994 | Padalino et al. | 395/112 |
| 5,377,016 A | 12/1994 | Kashiwagi etal. | 358/403 |
| 5,535,009 A | 7/1996 | Hansen | 358/296 |
| 5,774,356 A | 6/1998 | Hisatake et al. | 364/148 |
| 5,847,857 A | 12/1998 | Yajima et al. | 358/468 |

FOREIGN PATENT DOCUMENTS

| | | | | |
|---|---|---|---|---|
| EP | 0820185 A2 | 1/1998 | | H04N/1/00 |
| GB | 2284319 A | 5/1995 | | H04N/1/00 |
| GB | 2345813 A | 7/2000 | | H04N/1/00 |

Primary Examiner—Joseph Mancuso
Assistant Examiner—Douglas Tran

(57) ABSTRACT

A multiple-function copier including an image forming device, an accessory device, a user interface, and a communications mechanism. A method of operating the same is also provided. The image forming device is configured to receive print jobs from a network environment. The accessory device is operatively coupled with the image forming device and configured to receive copy jobs from a walk-up user. The image forming device and the accessory device are selectively operative in a print mode and a copy mode. The user interface is associated with one of the image forming device or the accessory device and is accessible by a walk-up user. The user interface is operative to detect submission of a copy job to the accessory device by a walk-up user. The communications mechanism is signal coupled with the image forming device and the accessory device, and is operative to automatically configure the image forming device and the accessory device for operation in the copy mode in response to a walk-up user interacting with the user interface.

18 Claims, 16 Drawing Sheets

RESERVE PRINTER

| BYTE | 0 | 1 | 2 | 3 |
|---|---|---|---|---|
| 0 | RESERVE PRINTER REQUEST ID (2) | | MESSAGE LENGTH (12) | |
| 4 | RESERVED (0) | | CLIENT ID | SEQUENCE NUMBER |
| 8 | REQUEST TYPE (0) | PRIORITY | RESERVED (0) | |

UNRESERVE PRINTER

| BYTE | 0 | 1 | 2 | 3 |
|---|---|---|---|---|
| 0 | UNRESERVE PRINTER REQUEST ID (2) | | MESSAGE LENGTH (12) | |
| 4 | RESERVED (0) | | CLIENT ID | SEQUENCE NUMBER |
| 8 | REQUEST TYPE (0) | RESERVED | RESERVED (0) | |

FIG. 7

METHOD AND APPARATUS FOR ALLOWING A WALK-UP COPIER USER TO INTERRUPT A PRINT JOB AT A BOUNDARY

FIELD OF THE INVENTION

This invention generally relates to multiple function document devices. More specifically, this invention relates to the control of print jobs sent across a network or I/O port to a printer having an attached document scanner when a walk-up user submits a copy job to the scanner attached to the printer for copying.

BACKGROUND OF THE INVENTION

The use of multiple function document devices has increased over the last few decades. Such devices combine the usefulness of separate document devices into one integral unit. Examples of document devices commonly combined include printers, copiers, optical scanners, medical imaging devices, satellite imaging devices, scientific data collection devices and facsimile machines.

In the present instance, a printer that receives print jobs sent across a network or I/O port is combined with a document scanner, thereby giving the user of the printer the option of scanning a document and printing a copy of this scanned image using the printer. This combination results in a "printer/scanner" device. Such printer/scanner devices also include photocopiers that can receive print jobs sent across a network or I/O port. In general, printer/scanner devices are well known to those skilled in art, and by consumers.

One major drawback with current printer/scannners has been the need for generally instant access to the scanner by a walk-up user needing to make a copy of a document. Commonly, such a user will approach the printer/scanner, intending to make a quick copy job of a document, only to find that another user has sent a currently printing print job to the printer. Current printer/scanners often work on a first-come-first-served basis with respect to jobs. Such job contention often results in the walk-up user needing to wait for the print job or jobs to finish before the walk-up user can make a copy of the document. Considering the time required to print a long document or multiple copies of a document, waiting for the printer to finish printing can result in frustration to the walk-up user, and a loss of productivity to the employer as the walk-up user is forced to stand at the printer/scanner awaiting his or her turn to use the printer/scanner.

The current solution, has been to allow the user to copy his or her document after the printing of the current print job is complete and before the next print job starts. However, this often proves unsatisfactory where the document being printed is long or consists of multiple copies, resulting in the walk-up user needing to wait for an amount of time as long as minutes for the current print job to complete.

What is needed is a method and apparatus allowing a walk-up user to interrupt a print job to make a copy where the interruption can take place at a job boundary, a mopy boundary or at a page boundary. A "job boundary" is the boundary between subsequent print jobs. A "mopy boundary" is the boundary between multiple original prints ("mopies"). A "mopy" exists where a user requests that a pair (or more) of prints be made of the same document. The "mopy boundary" exists between the end of a first mopy print of the document and the beginning of a second mopy print of the document. Finally, a "page boundary" is the boundary between individual pages of a particular print or mopy job request, for instance the page boundary between page 1 and page 2 of a multi-page print job.

Many references disclose printer/scanners or copiers having the ability to interrupt a job. For instance, U.S. Pat. No. 4,623,244 (Andrews et al.) discloses a copy production machine having a print mode for making copies under automatic control interruptible by a copy mode of making copies.

Another example is U.S. Pat. No. 5,206,73 (Gauronski et al.) which generally discloses a copier which has copy jobs that can be interrupted to perform a special copy job. The Gauronski, et al. patent discloses a job interrupt process for an electronic printer comprising the steps of: temporarily interrupting scanning of the job currently being scanned to commence scanning of a special job; continuing printing of the job then in process; when scanning of the special job is completed or at least sufficient to enable printing of the special job to be started, interrupting printing of the job then in process to start printing the special job; resuming scanning of the job that was interrupted when scanning of the special job is completed; and resuming printing of the job that was interrupted when printing of the special job is completed.

Another example, U.S. Pat. No. 5,377,016 (Kashiwagi et al.), discloses a multi-function image processing system allowing the user to change the priority of pending job tasks in order to print or copy a higher priority job before a lower priority job. The Kashiwagi et al. patent does not disclose a method or apparatus of interruption at a page boundary.

Another example is U.S. Pat. No. 5,535,009 (Hansen) which discloses a copier/printer operating with interrupts. The Hansen copier/printer is able to allow a higher priority print job to interrupt a lower priority copy job and vice versa. The Hansen patent does not disclose a method or apparatus of interruption at a page boundary.

A further example is U.S. Pat. No. 5,774,36 (Hisatke), which discloses a multi-function image forming apparatus which allows a smaller, later print job to be printed before a larger, earlier print job. The Histake patent does not allow the interruption to take place in the middle of the print job.

Another example is U.S. Pat. No. 5,847,587 (Yajima et al.), which discloses scanner/printer which is able to suspend the printing of a copy job in order to print higher priority print jobs. The Yajima et al. patent does not allow the interruption to take place in the middle of a copy job or print job.

In contrast to these inventions, the present invention discloses a job interrupt process for a multiple function document device comprising the steps of: sensing the request by a user to scan and make a copy of a document (copy job); determining whether a print job is in progress; interrupting said print job if copy job has a higher priority than said print job; determining whether the print job and the copy job can be performed simultaneously; determining whether the print job or the copy job is using or intends to use a finishing device; and, if necessary, interrupting the print job with a copy job at a job boundary, a mopy boundary or a page boundary.

SUMMARY OF THE INVENTION

The present invention has been made in view of the above circumstances and has an object of providing a method and an apparatus for allowing a walk-up user to interrupt a print job at a job boundary, at a mopy boundary or at a page boundary to reduce the user's waiting time and to improve productivity.

Another object of the present invention is the ability to save state, such as page boundary information, for the printing job in either RAM or out on hard disk in order to allow the copy job to interrupt (or vice versa).

Yet another object of the present invention is to start the copy job using resources tucked away or by first determining if enough resources are available. If enough resources are not available, the resources may be readjusted by moving RAM resources to disk.

Another object of the present invention is that resumption of operation is done paying special attention to things that may have changed during the copy job, for instance, paper size, color, etc.

Another object of the present invention is that different completed jobs are discharged into different discharge trays or bins.

Additional objects and advantages of the invention will be set forth in part in the description that follows and in part will be obvious from the description, or may be learned by practice of the invention. The objects and advantages of the invention may be realized and attained by means of instrumentalities and combinations particularly pointed out in the appended claims.

To achieve the objects and in accordance with the purposes of the invention, as embodied and broadly described herein, the multiple function document device comprises: an image forming system for printing an image on media, said image forming system able to receive print jobs from a network or an attached computer, said image forming system coupled to accessory device, said accessory device for accepting and scanning said copy job, said accessory device causing the image forming device to print said image.

BRIEF DESCRIPTION OF THE DRAWINGS

The accompanying drawings, which are incorporated in and constitute part of this specification, illustrate an embodiment of the invention and, together with the description, serve to explain the objects, advantages and principles of the invention.

FIG. 7 is a table illustrating the communications mechanism of FIG. 6 used by the copier to reserve the printer and to interrupt network print jobs.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

In illustrating an embodiment of the present invention, a multiple function document device is shown with copy and print capabilities that enable a walk-up user to submit a copy job to the device in a way that takes priority over print jobs. The such walk-up copying interruption may be overridden by the priority of a particular print job. However, it is to be understood that such multiple function device can involve other types of jobs in substitution for print jobs, such as facsimile jobs.

Figure 1:
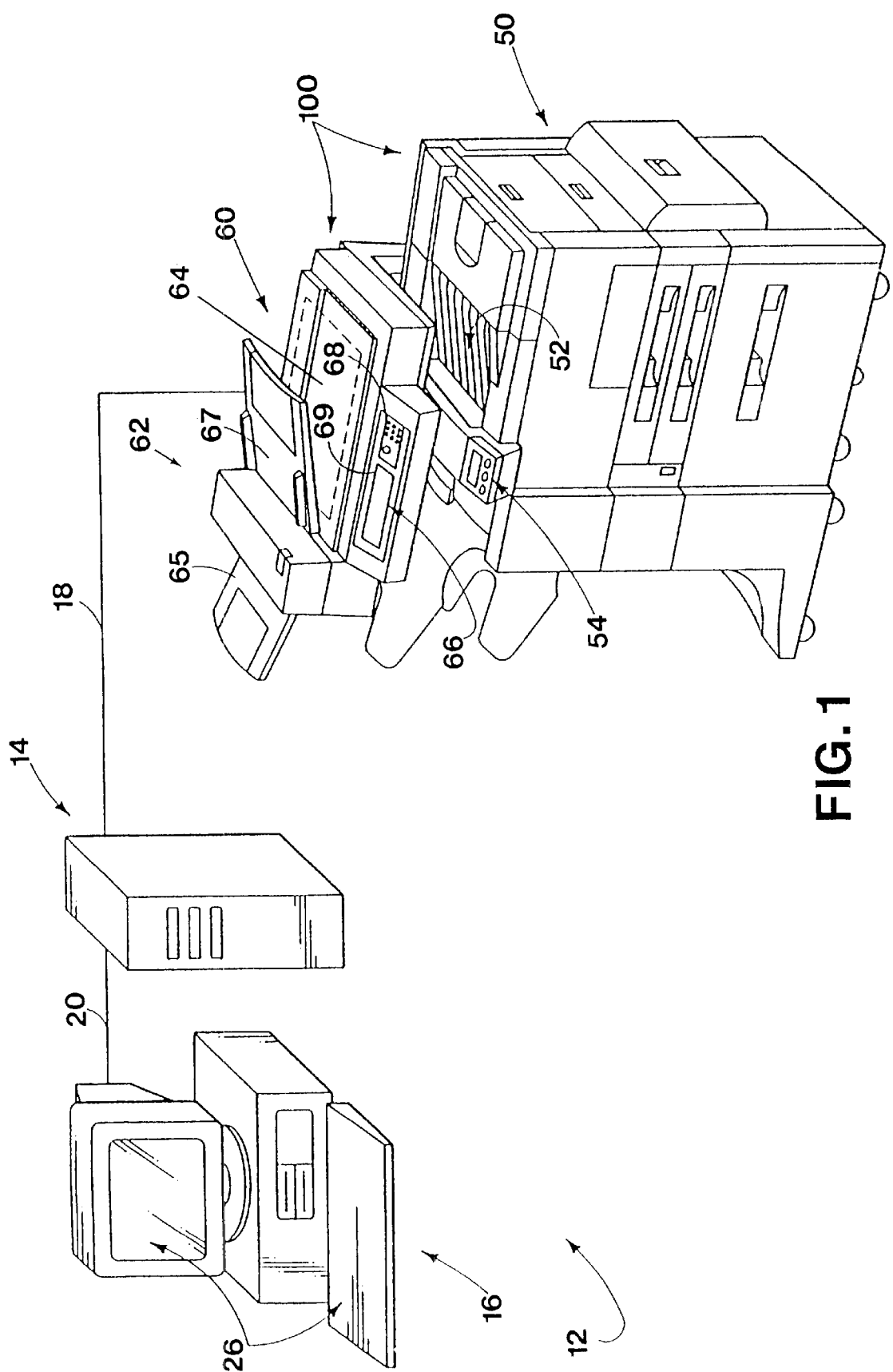
FIG. 1 is a perspective view of one multiple function network device embodied with features of this invention and implemented within a network environment as a copier also having network printing capabilities.

As shown in the embodiment shown in FIG. 1, the present invention is a multiple function document device 100. The device 100 is generally implemented as a network copy machine or copier provided within a network environment 12. Such a device 100 is commonly connected to a network server 14 from which multiple users can submit print jobs via one or more host computers 16 to the copy machine 100. As shown in FIG. 1, the computer 16 comprises a personal computer (PC), wherein the server 14 is signal coupled with the network copy machine 100 via a network line 18, and the personal computer 16 is signal coupled with the server 14 via a network line 20. Alternatively, any of a number of processor-based devices can be used to submit print jobs to the copy machine 10 such as pen-based computers, Internet access devices, notebook and laptop computers, handheld devices, larger mainframe computers, and even other printers provided within the same network environment 12.

The copy machine 100 comprises an image forming device 50 and an accessory device 60. In the preferred embodiment, the image forming device 50 comprises a printer, such as a laser printer, for printing documents, and the accessory device 60 comprises a scanner, for scanning documents to be printed. Accordingly, the accessory device 60 can generically be called a scanner, and the image forming device 50 generically called a printer in the described embodiment although other accessory devices and image forming devices are envisioned.

The computer 16 provides a print job user interface 26 through which an individual network user is able to submit print jobs to the copy machine 100. For example, a user is able to generate a multiple page text document via word processing software that is resident on the computer 16. The computer 16 includes a printer driver that converts a printing request within an application program into language understood by the printer 50 of the copier machine 100. The image forming device unit 50 of the copy machine 100 includes a print engine (not shown) to print such print jobs on paper or other media. Typically, the printer engine includes a laser and associated mechanisms for transferring toner onto the media.

In general, the accessory device 60 includes an input device adapted to receive an image to be reproduced. The accessory device 60 outputs image data pertaining to the image to the image forming device 50. For example, the accessory device 60 can scan images from provided pages and convert the scanned images into electronic data that is transmitted to the image forming device 50 and is printed.

The depicted accessory device 60 includes an automatic document feeder (ADF) 62 to provide automatic feeding and scanning of one or more documents. This ADF 62 further comprises an accessory device infeed tray 67 and an accessory device outfeed tray 65. In operation, a walk-up user inserts a document into the infeed tray 67 of the ADF 62. Individually scanned pages are then collected in the outfeed tray 65 after each page of the document is scanned via the accessory device 60. Alternatively, flatbed scanning may be provided by lifting the ADF 62 and placing individual pages upon an image reception device 64, such as a flatbed window of the accessory device 60.

The accessory device 60 further includes an accessory device user interface 66 configured to display status information regarding operation of the accessory device 60. The accessory device user interface 66 serves to enable a walk-up user to configure copy characteristics of the image forming device 50. For example, paper size can be selected via the accessory device user interface 66. Additionally, or optionally, a printed image can be lightened/darkened and/or enlarged/reduced. The accessory device user interface 66 includes a key or keypad 68 and a display screen 69. The accessory device user interface 66 is also operable to receive input from a user to control operation of the accessory device 60, in that a walk-up user is able to submit copy jobs directly into the accessory device 60 via the accessory device user interface 66.

The depicted image forming device 50 also includes a printer user interface 54 configured to display status information of the image forming device 50. The printer user interface 54 has a keypad and a display screen. The printer user interface 54 is also operable to receive input, such as print characteristics, from a user to control operation of the image forming device 50.

It is understood that user interfaces 54 and 66 can be formed by any one or more menus, display screens, touchpads, keyboards, keypads, buttons, help screens, tactile input devices, such as a mouse, and other input hardware/software. It is also understood that user interface 66 is to be associated with one of the image forming device 50 and the accessory device 60. It is also understood that user interface 54 is to be associated with one of the image forming device 50 and the accessory device 60.

An interface (not shown in FIG. 1) couples the image forming device 50 and the accessory device 60. Exemplary interfaces include a parallel connection, or an IEEE-1394 serial bus. The image forming device 50 includes a print engine (not shown in FIG. 1) configured to provide an image upon media that corresponds to received image data. Printed media including the images are provided to an output bin 52. Additional bins, for collation or mailbox usage purposes may also be present.

Figure 2:
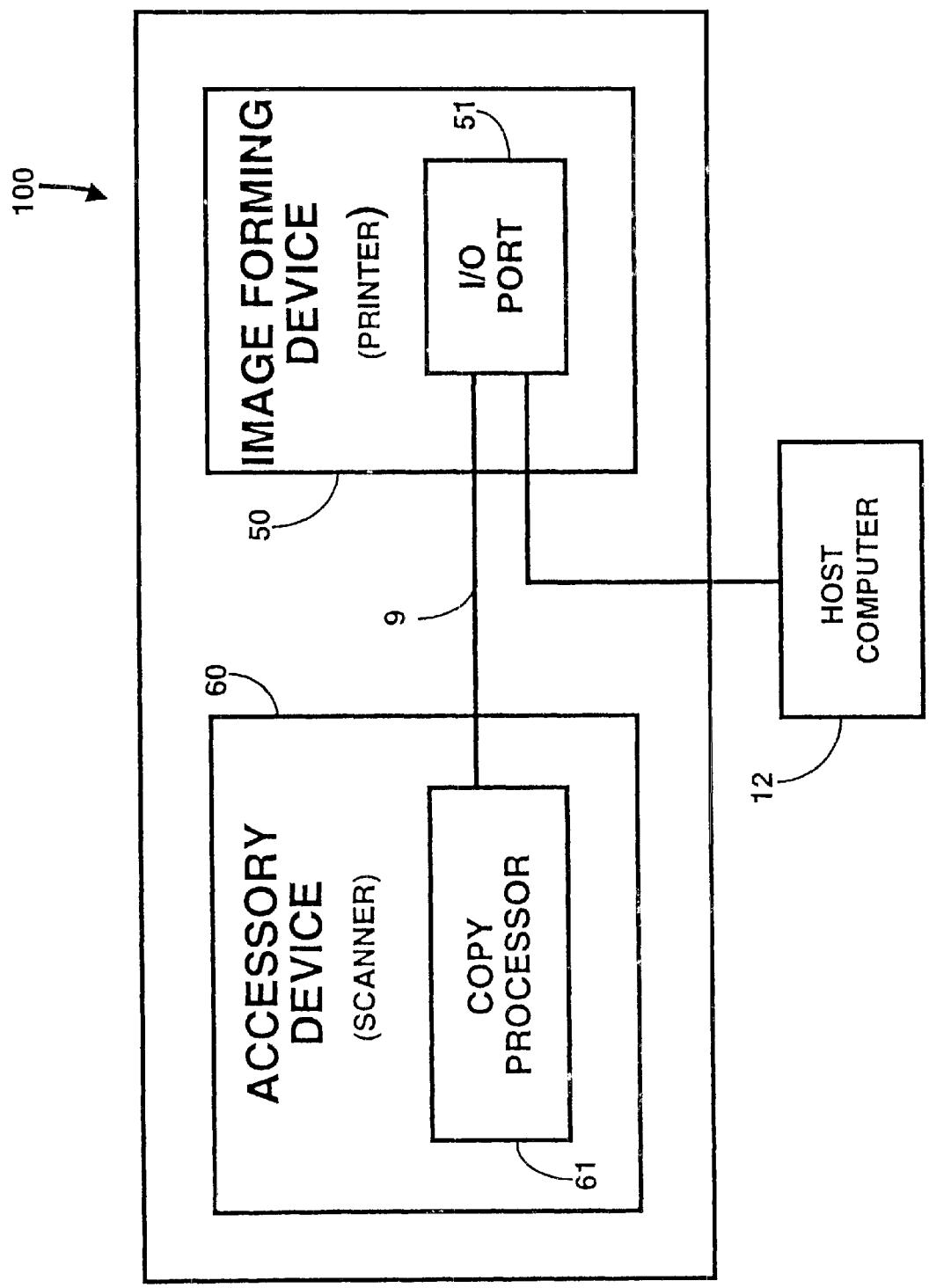
FIG. 2 is a functional block diagram of the printer system shown in FIG. 1.

Referring to FIG. 2, a high level functional block diagram of one embodiment of the copy machine 100 is illustrated. The copy machine 100 includes an image forming device 50 coupled with an accessory device 60. An interface 3 is coupled intermediate the image forming device 50 and the accessory device 60. The accessory device includes a copy processor 61 configured to communicate data intermediate internal components of the accessory device 60 with interface 53.

FIG. 2 generally depicts communication channels intermediate various components and does not depict internal circuitry of the individual components. The image forming device 50 includes an input/output (I/O) port 51 configured to communicate data intermediate the interface 53 and internal components of the image forming device 50. In some embodiments, I/O port 51 is also configured to couple with an external host computer 12. Host computer 12 can be configured to communicate image data and other information to I/O port 51 of the image forming device 50.

Figure 3:
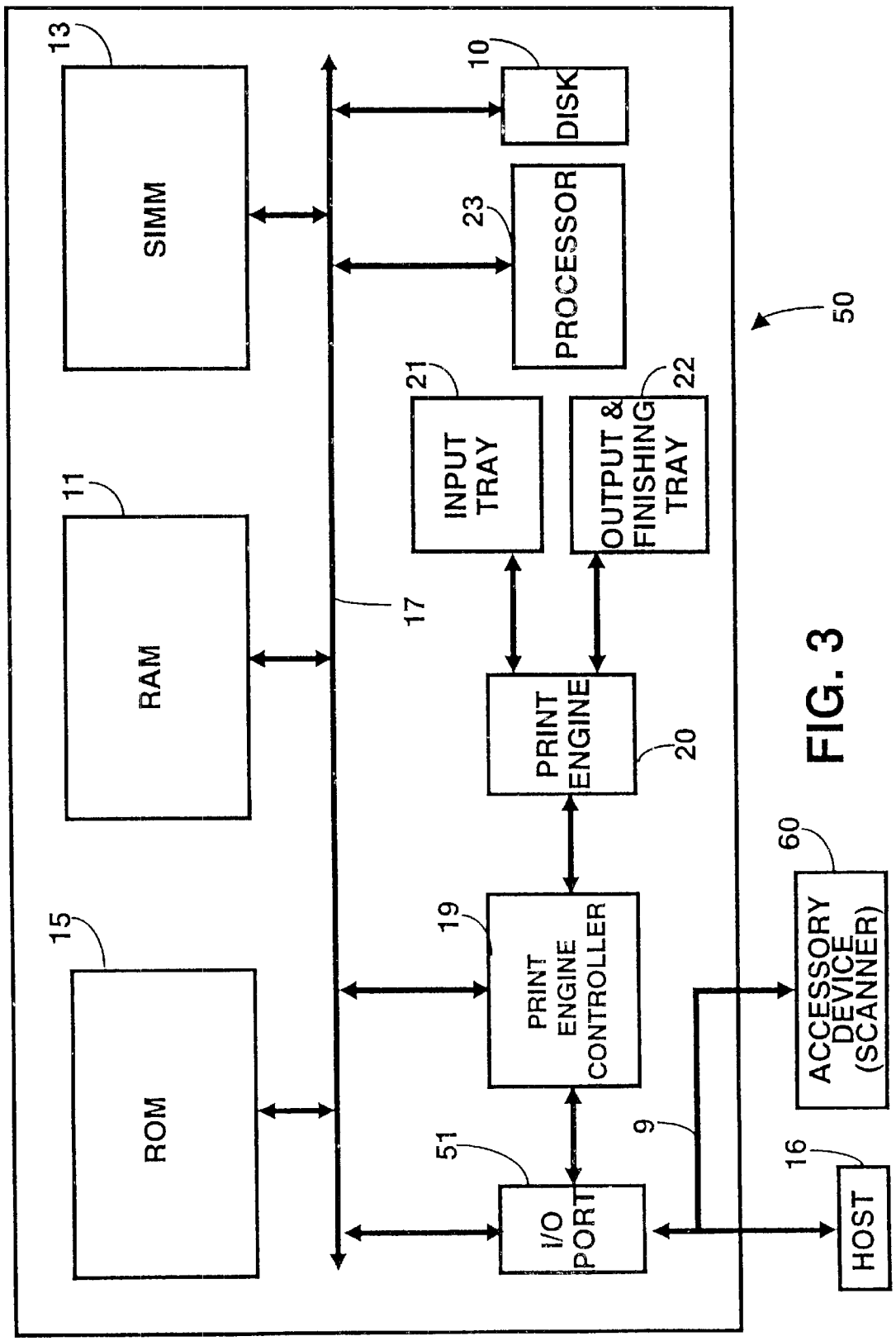
FIG. 3 is a functional block diagram of hardware components of an exemplary image forming device of the printer system.

Referring to FIG. 3, hardware of an exemplary image forming device 50 is illustrated. As referred to above, the present invention is described with reference to the image forming device 50 being a printer. However, the present invention is not limited to the disclosed arrangement, but is applicable to other systems including other image forming devices and peripheral device configurations. Exemplary alternative image forming devices include facsimiles, copiers, and multiple function peripheral devices.

The depicted embodiment of the image forming device 50 comprises a plurality of storage devices 45 including a single-in-line-memory module (SIMM) device 13, random-access memory (RAM) device 11, read-only memory (ROM) device 15, and hard disk drive storage device 10. Storage device 13 can also comprise a dual-in-line-memory module (DIMM) in another arrangement (not shown). Individual storage devices 10, 11, 13, 15 are coupled with a bidirectional bus 17 for implementing data communications within the image forming device 50. While particular storage devices 45 are mentioned throughout this application and claims, these storage devices 45 are intended to be interchangeable.

Additional hardware of the depicted image forming device 50 includes an input/output port 51, print engine controller 19, print engine 20, input tray(s) 21, and output and finishing tray(s) 22. The image forming device 50 additionally includes a processor 23, such as a microprocessor, configured to control functions of the image forming device 50. The processor 23 communicates with other hardware elements of the image forming device 50 via bus 17.

The I/O port 51 comprises an input/output device adapted to couple with the accessory device 60 and host computer 12. The host computer 12 can include a personal computer or network computer arrangement external to the image forming device 50. The I/O port 51 can comprise an IEEE-1394 serial interface and/or a standard 1284 parallel interface that provides communications with the accessory device 60 and page description language (PDL) from host computer 12 for processing within the image forming device 50.

Further, other data can be communicated using I/O port 51.

The print engine controller 19 and associated print engine 20 are coupled to bus 17 and provide print output capability for the image forming device 50 in but one embodiment. Sheet media is pulled from input tray 21 into print engine 20 and subsequently directed to output and finishing tray 22. Output and finishing tray 22 includes, in an exemplary embodiment, finishing feature mechanisms such as sheet registration, binding, stapling, punching, and the like, and may include one or more bins for collation or "mailbox" usage purposes. Input tray 21 may also include a plurality of input trays for varied media selection.

According to the described embodiment, print engine 20 is a multi-resolution capable engine. For example, it can print, selectively at 600 or 1200 dots per inch (dpi). For purposes of this disclosure, print engine 18 is a laser printer that employs an electrophotographic drum imaging system. Other image forming devices are utilized in other embodiments.

In general, the operation of the image forming device 50 commences responsive to the reception of page description language (PDL) data from host computer 12 or image data from the accessory device 60 from I/O port 18. The page description language data or image data is initially placed in random-access memory (RAM) 11 or another storage device. A working or backup copy of this PDL data or image data is preferably written to the hard drive. Preferably, when enough of the forwarded image data is stored in the first storage device or RAM to start the printing of the copy job, the remainder of the forwarded image data spooled to the second storage device or hard disk drive to be later spooled to the first storage device as resources in the first storage device are freed. Processor 23 accesses the page description language data and/or image data from RAM 11, and performs operations specified by firmware.

Random-access memory 11 provides main memory storage capabilities within the image forming device 50 for storing and processing print job data streams received from host computer 12 and image data from the accessory device 60. Random-access memory 11 comprises dynamic random-access memory (DRAM) in an exemplary embodiment. Read-only memory (ROM) 15 contains firmware that controls operation of the processor 23 and image forming device 50.

Figure 4:
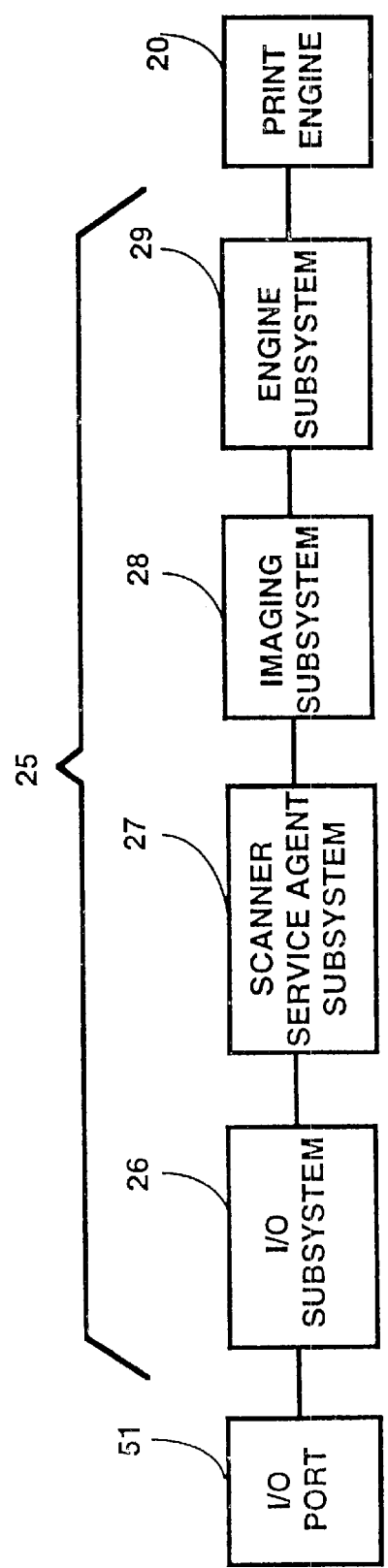
FIG. 4 is a functional block diagram of exemplary firmware subsystems of the image forming device.

Referring to FIG. 4, exemplary firmware code procedure 2 stored in ROM is depicted. Firmware 25 includes an input/output (I/O) subsystem 26, a scanner service agent (SSA) subsystem 27, an imaging subsystem 28 and an engine subsystem 29. Other configurations of image forming devices 50 are possible.

I/O subsystem 26 is operable to accept inbound data received from I/O port 51 and prepare outbound data for communication via I/O port 51. I/O subsystem 26 is configured to strip I/O specific data from the received data and provide the remaining data (e.g., image data, page description language) into a buffer.

SSA subsystem 27 is configured to retrieve the received data from the buffer and apply selected data to imaging subsystem 34 for further processing. SSA subsystem 27 analyzes and interprets the incoming data (e.g., image data, page description language data, command data, etc.).

SSA subsystem 27 can provide specific job and printer status information to copy processor 61 and manage a peripheral management language (PML) interface intermediate image forming device 50 and accessory device 60. Copy processor 61 of accessory device 60 preferably receives PML code from image forming device 50 during a boot cycle as described in detail below. Downloading appropriate code to copy processor 61 enables interfacing of accessory device 60 and image forming device 50.

SSA subsystem 27 processes command data and selectively replies to the accessory device 60 responsive to the particular command. SSA subsystem 27 manages file system interface between image forming device 50 and accessory device 60.

SSA subsystem 27 is operable to forward print data comprising image data or page description language (PDL) data to imaging subsystem 28 for further processing. SSA subsystem 27 is further operable to format image data received from accessory device 60 for the appropriate PDL or personality of image forming device 50.

Imaging subsystem 28 contains a parser and rasterizer configured to respectively parse and rasterize a data stream to be printed. In particular, imaging subsystem 28 is configured in the described configuration to generate a display command list. Imaging subsystem 28 includes rasterizer firmware configured to convert individual display commands to an appropriate bit map (rasterized strip) and distribute the bit map into RAM 11. Compression firmware may be provided to compress the rasterized strips in the event insufficient memory exists in RAM 11 for holding the rasterized strips.

The rasterized data may be retrieved from RAM 11 by engine subsystem 29. Engine subsystem 29 interfaces with print engine 20 to provide the rasterized data to be printed upon the media. Rasterized strips of data are passed to print engine 20 by print engine controller 19 thereby enabling the generation of an image (i.e., text, graphics, etc.) when a page is closed for processing (i.e., all strips have been evaluated, rasterized, compressed, etc.). Engine subsystem 29 controls the sequencing and transferring of page strips to print engine controller 19. Engine subsystem 29 additionally controls the operation of print engine controller 19 and print engine 20.

Figure 5:
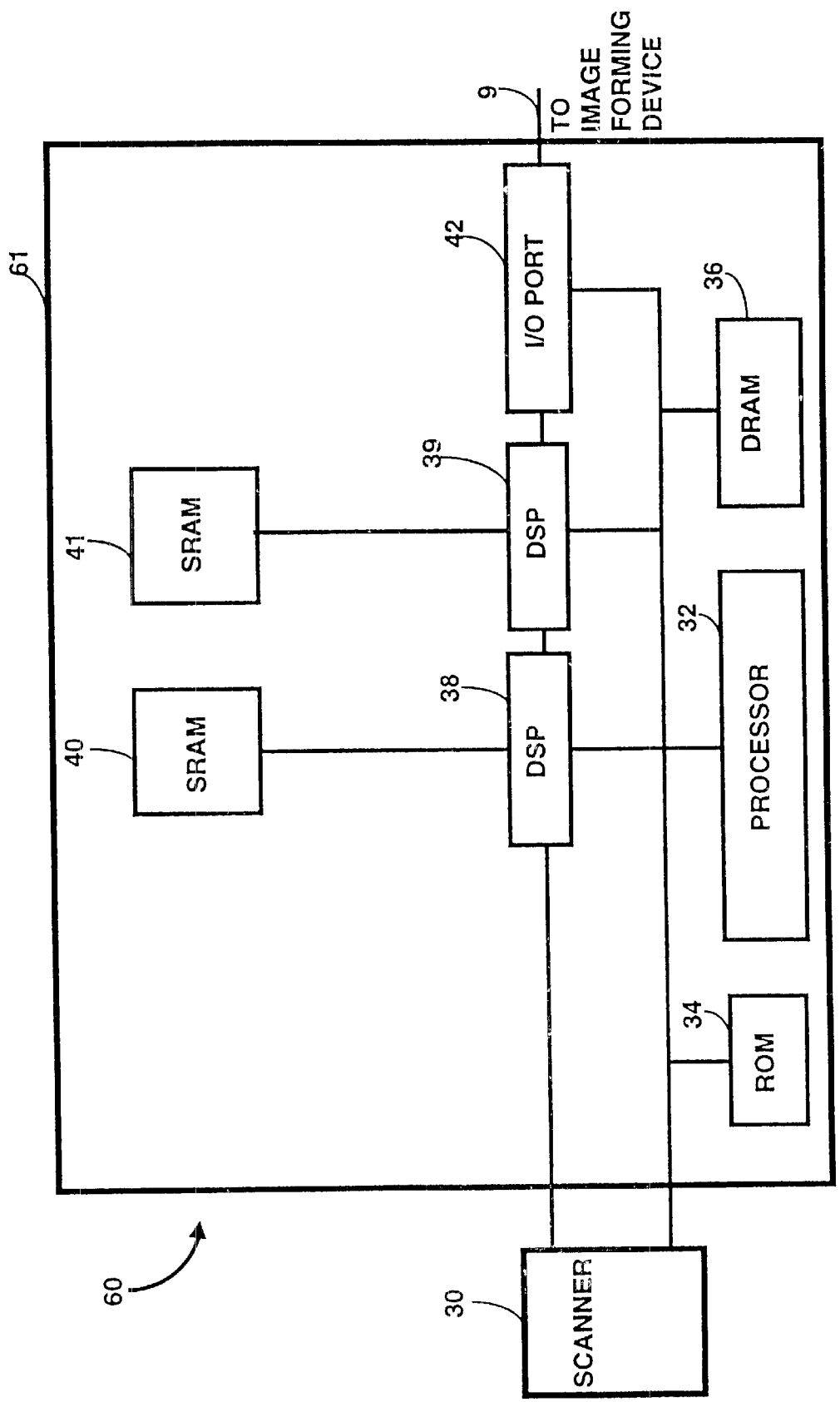
FIG. 5 is a functional block diagram of hardware components of an exemplary accessory device of the printer system.

Referring to FIG. 5, hardware of an exemplary accessory device 60 is illustrated. The depicted accessory device 60 includes a copy processor 61 coupled with a scanner 30. Copy processor 61 resides within a slot of scanner 30 in an alternative embodiment. Other arrangements of accessory devices 60 are possible.

Copy processor 61 may be configured to provide the following functionality including: image processing, interfacing with the image forming device 50, interfacing with and controlling scanner 30, operating user interface 66 of accessory device 60, and mapping user settings to configuration data appropriate for internal processing of scanned images. Copy processor 61 is also operable to provide loading of operational data (also referred to as runtime data) for image forming device 50 to accessory device 60 in accordance with configuration methodologies of the present invention 100. Such loading of operational data is described in detail below.

The depicted copy processor 61 includes an internal processor 32. One configuration of processor 32 comprises a 16-bit microprocessor having part designation 68306 available from Motorola, Inc. The depicted copy processor 61 also comprises a read-only memory device 34, a dynamic random-access memory (DRAM) storage device 36, plural digital signal processors (DSPs) 38, 39, plural static random-access memory (SRAM) storage devices 40, 41, and an I/O port 42.

During power-up, microprocessor 32 boots using boot process firmware stored within read-only memory storage device 34. Thereafter, processor 32 runs through start-up diagnostics and attempts to communicate with scanner 30 and image forming device 50 coupled with I/O port 42. Copy processor 61 obtains its operational code from image forming device 50. In particular, upon achieving successful communication with image forming device 50, operational or runtime data (including executable code for processor 32) is downloaded from image forming device 50 into DRAM storage device 36 in accordance with the present invention 100. If during power-up, accessory device 60 fails to detect an attached image forming device 50, copy processor remains idle and periodically polls to monitor for attachment of image forming device 50. Following successful downloading of operational data, copy processor 61 completes its diagnostics and is thereafter in a ready state of operation.

During operation, a user can input commands via user interface 66 shown in FIG. 1. User inputted commands are received by copy processor 61. Scanner 30 is configured to scan provided images utilizing an internal scanner engine (not shown). Scanner 30 outputs image data corresponding to the received images to copy processor 61.

Communications intermediate accessory device 60 and scanner 30 include a scanner control channel and an image data bus. Copy processor 61 can be connected to internal electronics of scanner 30 via an internal EX slot of scanner 30. In the preferred embodiment, copy processor 61 acts as the master of communications with scanner 30 and thus, no unsolicited data flows from scanner 30 to copy processor 61. An exemplary control channel intermediate processor 32 and scanner 30 comprises a half-duplex asynchronous serial bus at TTL-levels. A scanner image bus coupled intermediate scanner 30 and first digital signal processor 38 comprises a uni-directional 8-bit parallel link providing communications at 10 MHZ in accordance with the described embodiment.

Processor 32 preferably controls user interface displays within scanner 30 and monitors user inputs provided into scanner 30. Processor 32 can include plural embedded peripherals including a DRAM controller, timers and UARTs for scanner communication and debug. Digital signal processors 38, 39 are configured to transfer image data intermediate scanner 30 and interface 9 for application to image forming device 50. Such enables processor 32 to control user interface 9 and PJL and PCL control sequences utilized to provide image transfers from accessory device 60 to image forming device 50.

Image data is forwarded from scanner 30 into plural digital signal processors 38, 39. In one embodiment, digital signal processors 38,39 individually comprise a part designation PM-44 DSP available from Pixel Magic, Inc. Digital signal processors 38, 39 are operable to provide a plurality of processing functions for received image data from scanner 30. For example, digital signal processors 38, 39 can be configured for functions including background removal, filtering, clipping, scaling, block rotation, resolution enhancement, sideband conversion, etc.

Individual SRAM storage devices 40, 41 are dedicated to respective digital signal processors 38, 39 and are available to temporarily store image data during the processing of the data. The processed image data is forwarded to I/O port 42 for application to image forming device 50. In particular, image data may be applied to interface 9 for application to image forming device 50 with PJL and PCL commands implemented by processor 32.

Preferably, image forming device 50 contains appropriate memory to store the transferred image data. Image data is stored within RAM 11 in the described configuration. A working or backup copy of this image data is stored on the hard disk drive 10 of the image forming device 50 Image data may be applied to image forming device 50 via interface 9 on a line-by-line basis as soon as processing is completed within digital signal processors 38, 39.

Interface 9 is configured to provide additional communications intermediate image forming device 50 and accessory device 60. For example, printer status responses and user settings programmed via user interface 54 of image forming device 50 may be applied to copy processor 61 via interface 9. Likewise, user settings inputted via user interface 66 of accessory device 60 may be applied to image forming device 50 via interface 9. Printer control commands can be outputted via copy processor 61 and applied to interface 9 and image forming device 50. In the preferred arrangement, copy processor 61 is typically the master of the communications with the image forming device 50.

Operational or runtime data is outputted from image forming device 50 to accessory device 60 in accordance with the present invention. More specifically, upon power-up of accessory device 60, processor 32 boots itself from ROM storage device 34. Thereafter, processor 32 initiates a transfer requesting the remainder of the operational data including code from image forming device 50. Operational data is stored within image forming device 50 in the preferred embodiment.

In particular, operational data is stored upon hard disk drive 10 of image forming device 50 and is downloaded via interface 9 to DRAM storage device 36. The operational data can include firmware comprising code for operating accessory device 60, configuration parameters including microcode for digital signal processors 38, 39, and display information utilized to form screens for user interface 66. The operational or runtime data that is downloaded can comprise more or less data or code.

Following completion of the transfer of operational data from image forming device 50 into DRAM 36 of accessory device 60, processor 32 executes the received operational data from DRAM 36. Such provides the benefits of facilitating updates or modification of operational data or code utilized for operations of accessory device 60. Modified operational data including updates to the accessory device firmware can be implemented by downloading a new file to hard disk drive 10 or other storage device of image forming device 50. The downloading can be implemented using host computer 16 comprising a personal computer, network, etc. in an exemplary embodiment.

Figure 6:
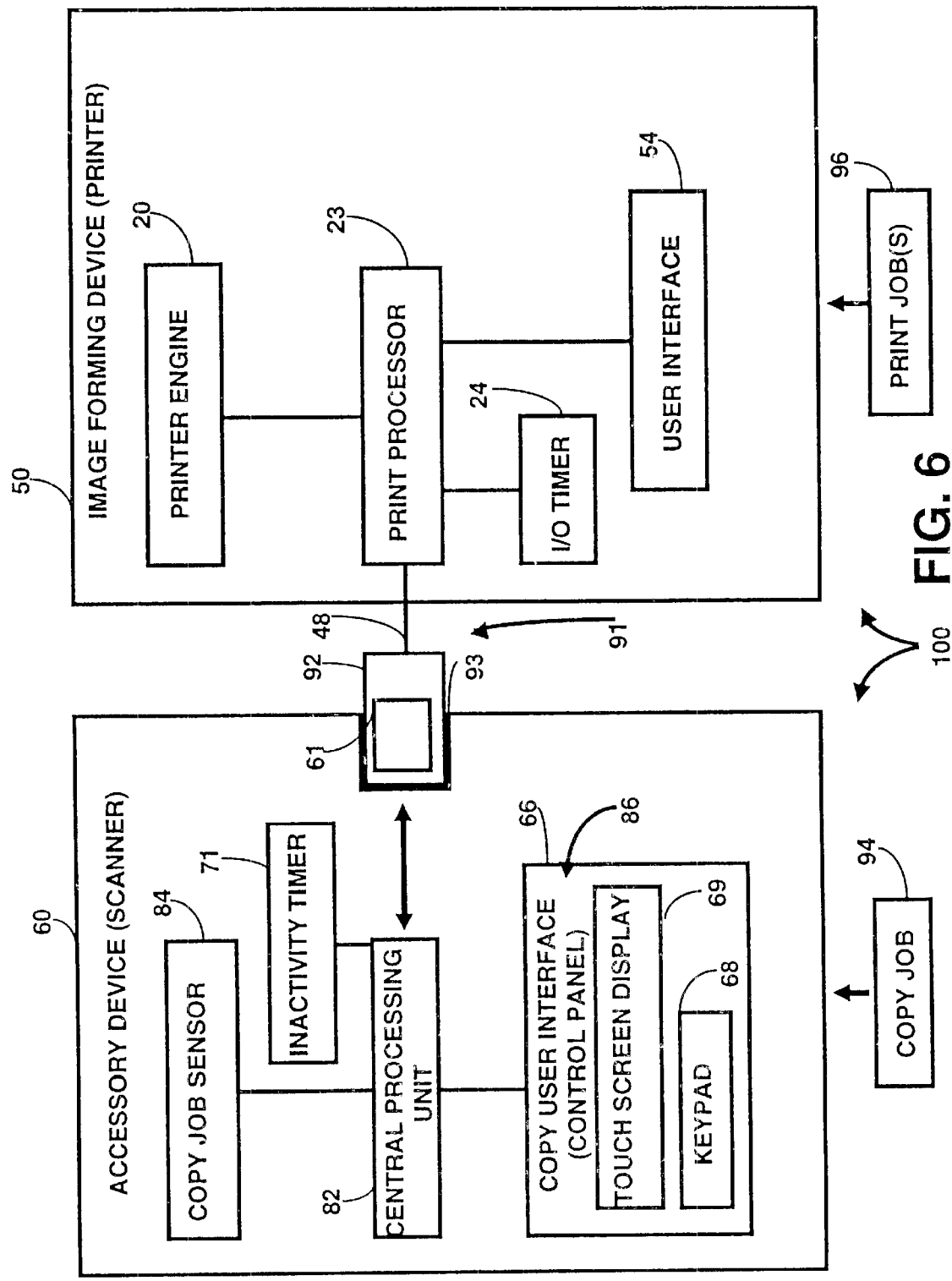
FIG. 6 is a functional block diagram of an embodiment of the invention illustrating a system for temporarily locking out print jobs on a network copier when a walk-up copier user is present.

FIG. 6 illustrates a functional block diagram of one presently preferred embodiment of the invention depicted in FIG. 1 illustrating a system for temporarily interrupting one or more print jobs 96 on a network copier 100 when a walk-up user is submitting a copy job 94. More particularly, the accessory device 60 and the image forming device 50 are shown coupled together via a serial bus 48. One suitable bus is provided by an IEEE-1394 serial bus. A corresponding IEEE-1394 interface (not shown) is used to attach bus 48 to image forming device 50. An opposite end of bus 48 terminates in a copy processor (CP) card 92. Copy processor card 92 is installed into a slot 93 provided in the accessory device 60. Copy processor card 92 includes a copy processor 61 and performs image processing and manages the accessory device user interface (UI) 66. In operation, copy processor card 92 cooperates with slot 93 to proved a communication mechanism 91 that interfaces with a central processing unit (CPU) 82 of the accessory device 60. Card 92 is operative to reserve and unreserve image forming device 50 when a walk-up user is submitting a copy job 94 to the copy machine 100.

Copy processor card 92 includes a copy processor (CP) 61. Copy processor 61 forms the main processor for the device 100. Furthermore, copy processor 61 serves to choreograph, via communications mechanism 91, the reservation of the image forming device 50 and interruption of network print jobs 96. Although IEEE-1394 bus 48 is a serial bus, copy processor 61 only communicates with the image forming device 50 over bus 48 and operates as an accessory of the image forming device 50.

As further shown in FIG. 2, the scanner infeed tray 67 (see FIG. 1) of the accessory device 60 includes at least one tactile, copy job sensor 84 configured to detect when a walk-up user has loaded a copy job 94 into the document feeder or tray 67 of the accessory device 60, or on the flatbed portion of the scanner unit 32. In one instance, sensor 84 provides a user interface. According to one construction, sensor 84 is provided at a location within scanner infeed tray 67 (of FIG. 1) such that the presence of a document within tray 67 can be detected. Alternatively, sensor 84 can be an optical, electrical and/or a mechanical sensor provided on one of the platen, platen cover, glass, or any component of the flat bed. Optionally, sensor 84 can be formed by a proximity detector such as a capacitive, infra-red, or a microwave sensor. Further optionally, sensor 84 can be formed by any detector associated with the printer and/or scanner and operative to detect the presence of a walk-up user and/or the submission of a copy job.

The image forming device 50 of copy machine 100 also includes a print processor 23, a print engine 20, and an input/output (I/O) timer 24. Print processor 23 comprises a central processing unit (CPU) forming the processing hardware in the image forming device 50. The printer engine 20 comprises the portion of the image forming device 50 that actually performs printing. For example, in a laser printer, the print engine includes a laser and the mechanism used to transfer toner to paper.

According to one implementation, printer engine 20 consists of a 32 ppm wide-format printer engine that will be sold under the model name "Mopier 320," and a 32 ipm wide-format duplex scanner unit that will be sold under the model name "Digital Copy 320." Since printer engine 20 and image forming device 50 cooperate to form a network printer, and the accessory device 60 adds copying capability to it, the two together form a network copy machine 100.

As a result of the implementation depicted in FIG. 6, communications mechanism 91 enables the copy machine 100 to reserve the image forming device 50 when a walk-up copier user arrives, and to unreserve the image forming device 50 when the user is done and is no longer detected via sensor 84. Additionally, communications mechanism 91 enables the copy machine 100 to interrupt a network print job 96 that is already in progress, and is presently being printed on the image forming device 50. Hence, such walk-up user is not made to wait unnecessarily while attempting to submit a copy job 94 to the copy machine 100.

FIG. 7 illustrates implementation details of communications mechanism 91 as used by the present invention 100, and more particularly copy processor 61, to reserve the image forming device 50 and interrupt network print jobs 96 (of FIG. 6). Furthermore, the implementation details are shown for unreserving the image forming device 50 so as to resume network print jobs 96 after a walk-up user is done.

As shown in FIG. 7, the communications mechanism for reserving a printer is shown as "RESERVE PRINTER." The message "RESERVE PRINTER" is used by the copy processor, or client, to send a "RESERVE PRINTER" request to the server, or printer. Here the server comprises an application running on the printer. The delivery of such message, "RESERVE PRINTER," causes the server to request the printer job channel. Once the server has locked into the job channel, no print jobs from any other sources can be initiated.

For purposes of FIG. 7, "priority" refers to an enumeration specifying the priority of a particular request. The following priorities are supported by implementation details of Applicants' communication mechanism:

eJobBoundary (0)—lock the job channel at the next print job boundary.

eMopyBoundary (1)—lock the job channel at the next mopy boundary. A mopy is an individual copy within a mopy ("Multiple Original Print") job.

ePageBoundary (2)—lock the job channel at the next page boundary. This interrupts the current job at the end of the current page.

Also according to FIG. 7, the "UNRESERVE PRINTER" message is used by the copy processor, or client, in order to send a "UNRESERVE PRINTER" request to the printer, or server. This message causes the server to release the print job channel if it has been locked. Once the server has unlocked the job channel, print jobs from other sources can begin. Accordingly, the messages depicted in FIG. 7 illustrate one implementation for a communication mechanism for a copy processor (CP) for reserving and unreserving a printer.

In operation, the copy processor (CP) will process inputs from the copier user interface 66 (see FIG. 6). For example, the copy processor will process when a key is pressed by a walk-up user via user interface keys on keypad 68. In this manner, the copy processor can periodically check for printer status changes according to the implementation details depicted in FIGS. 8 and 9A–B. In one case, the copier user interface may be managed by the copy processor via the scanner unit CPU. In another case, the copier user interface may be integrated with the printer user interface. In the latter case, firmware within the printer unit will process copier user interface key presses on behalf of the copier unit.

While in the "scanner idle" state, copy processor (CP) 61 will periodically check for state changes from sensor 84, key presses (e.g., hard keys from keypad 68 and/or touch screen display 69) and changes in operating status of image forming device 50 and accessory device 60 (see FIG. 6). An inactivity timer 71 is reset whenever a key is pressed or a copy job is completed (as detected with the sensor). If inactivity timer 71 expires, the copy processor (CP) will set the settings on a control panel 86 back to their default values and display the main tab sheet. According to one implementation, inactivity timer 71 is operated to detected inactivity from a walk-up user extending continuously on the order of 15–30 seconds.

Figure 8:
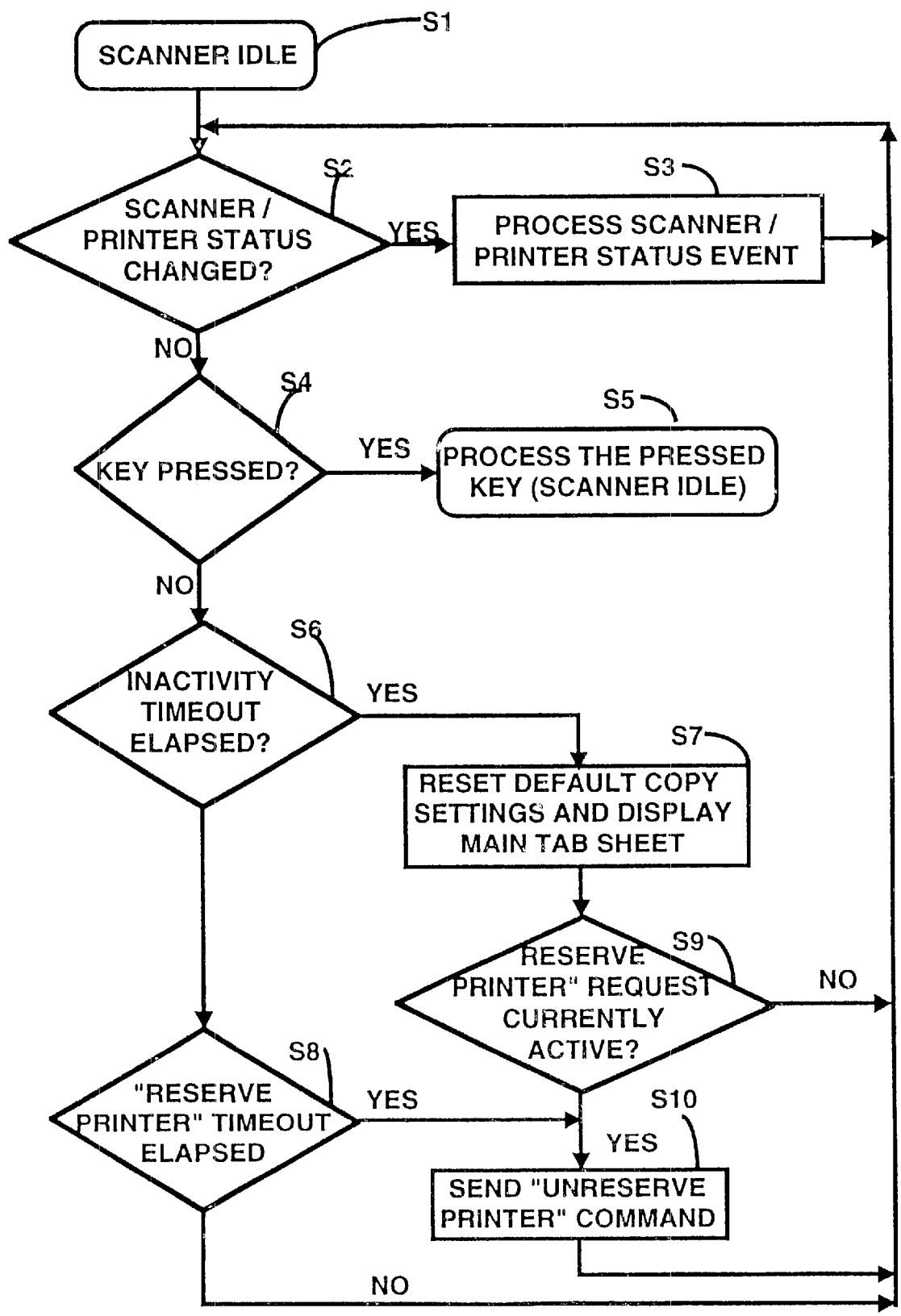
FIG. 8 is a flowchart illustrating one version of a simplified polling process for the copier.
Figure 9A:
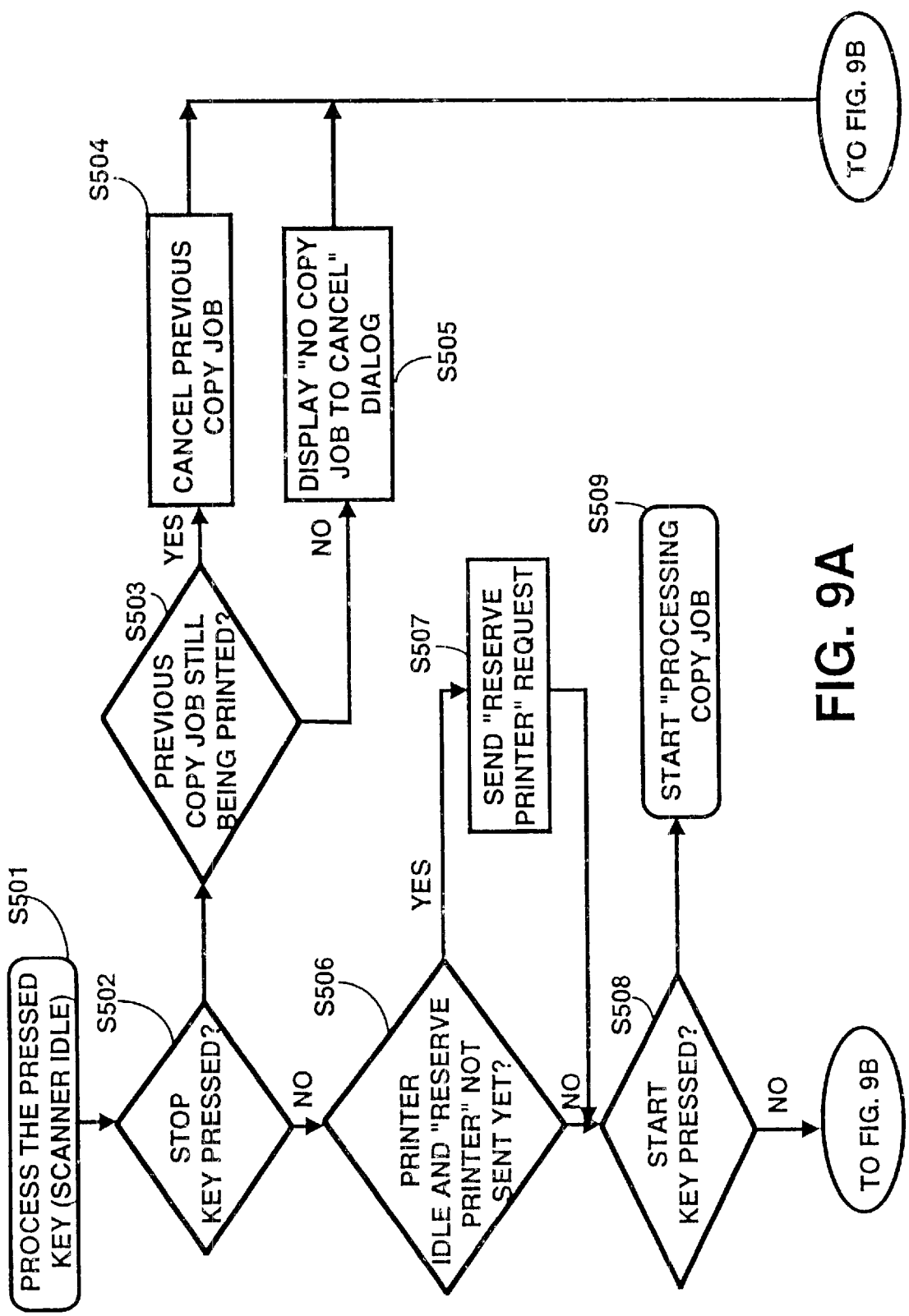
FIGS. 9A and 9B together form a flowchart illustrating in greater detail the step of processing a "pressed key," as shown in FIG. 8, which places the copier scanner into an idle mode.
Figure 9B:
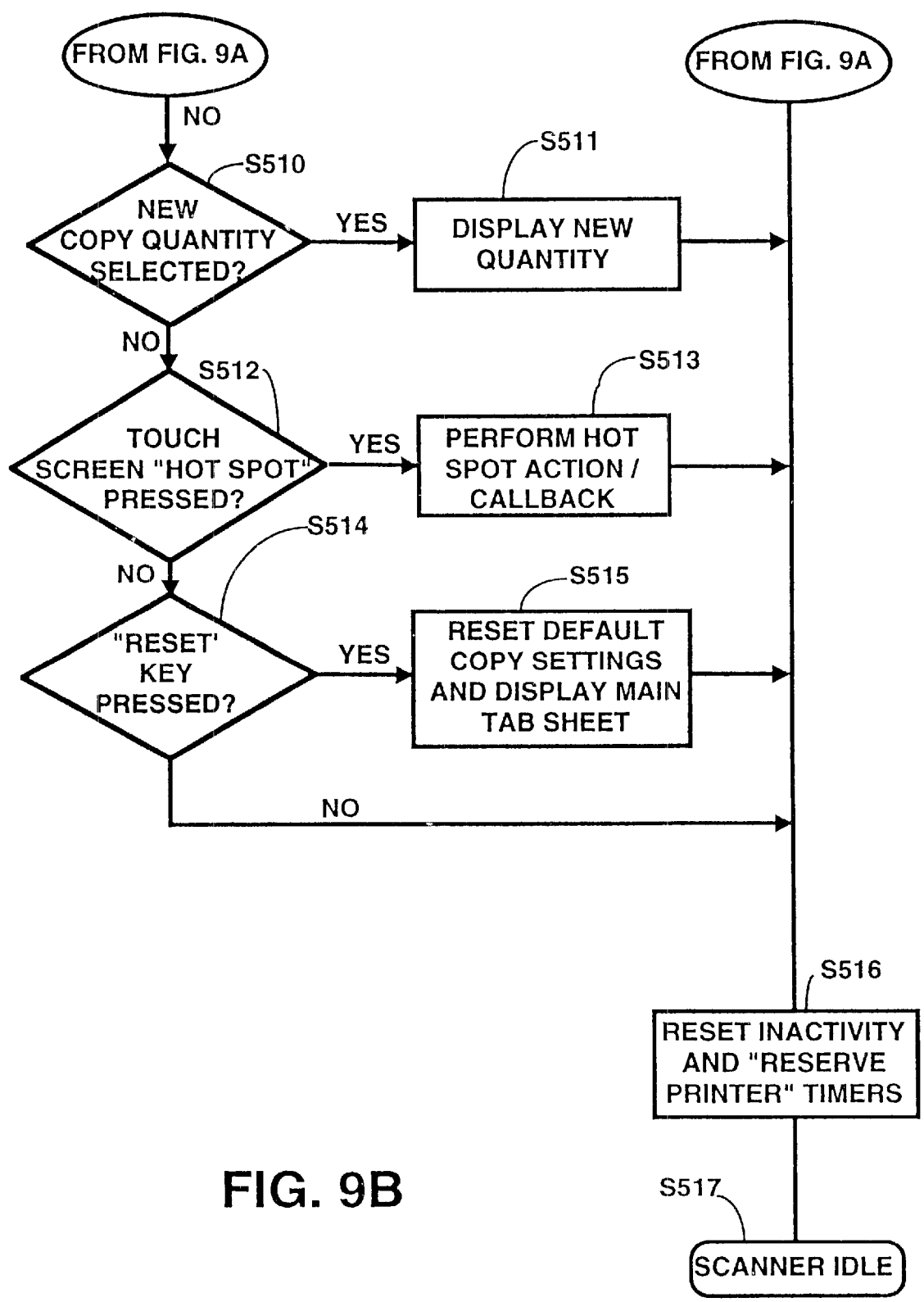

FIGS. 8 and 9A–B show flowcharts illustrating implementation of a simplified polling process for multiple function copy machine 100 depicted and described with reference to FIGS. 1–7. Such polling process provides one technique for determining whether a walk-up user is submitting a copy job to the copy machine, requiring that any print jobs be delayed and/or interrupted. However, there is no requirement that the copy processor use a polling process. Preferably, the copy processor will use an interrupt-driven process, as shown in FIGS. 10–14.

Although not shown on the flowcharts of FIGS. 8 and 9A–B below, some status events may cause the copy processor to return to an earlier state. For example, if the printer unit is power cycled or the 1394 bus is reset, the copy processor may need to resynchronize with the printer unit. Furthermore, other status events may cause the copy processor to enter a device attendance mode (e.g., scan lamp failure).

When a key on the copier user interface is pressed (Step "S4" of FIG. 8), the copy processor will debounce the key (if necessary) and process it. If a stop key on the copier user interface is pressed (Step "S502" of FIG. 9A), and if a previously scanned copy job is still being printed (Step "S503" of FIG. 9A), the copy processor will send a job cancel request (Step "S504") to the printer unit.

Optionally, if an interrupt key is also provided on the copier user interface and the interrupt key is pressed (not shown in FIGS. 8 and 9A–B), the copy processor will send a "reserve printer (mopy boundary)" or "reserve printer (page boundary)" request (Step "S507") to the printer unit. Such interrupt key can also be provided as a touchscreen key. Whether the copy processor sends the mopy boundary or the page boundary version depends on the specific technique being implemented. This request (Step "S507") will cause the printer unit to suspend the current print job, if it is printing one, at the mopy or page boundary. The printer unit will also hold off network print jobs (or jobs from any other I/O source) received after the printer receives the request. The copy processor will then cancel the "RESERVE PRINTER" request after an inactivity timeout has passed (Step "S6") by sending an "UNRESERVE PRINTER" request (Step "S10"). The suspended job will be resumed at that time. The printer unit has an I/O timeout period, and if the copy processor fails to either send additional I/O or cancel the request within the I/O timeout period, the printer unit will automatically cancel the request.

When any key except the stop key or interrupt key is pressed, or if a user-activated sensor changes state, the copy processor will send a "reserve printer (job boundary)" request (Step "S507") to the printer unit. This will cause the printer unit to finish the current print job, if it is printing one, and hold off network print jobs (or jobs from any other I/O source) received after the printer unit receives the request. The copy processor will cancel the "RESERVE PRINTER" request after an inactivity timeout by sending an "UNRESERVE PRINTER" request (Step "S510"). The printer unit can also automatically cancel the request after an I/O timeout period. Thereafter, the scanner is idle (Step "S517").

Referring to FIGS. 10–14, the flowcharts illustrate one exemplary process for interruption of a print job by a copy job submitted by a walk-up user.

Figure 10:
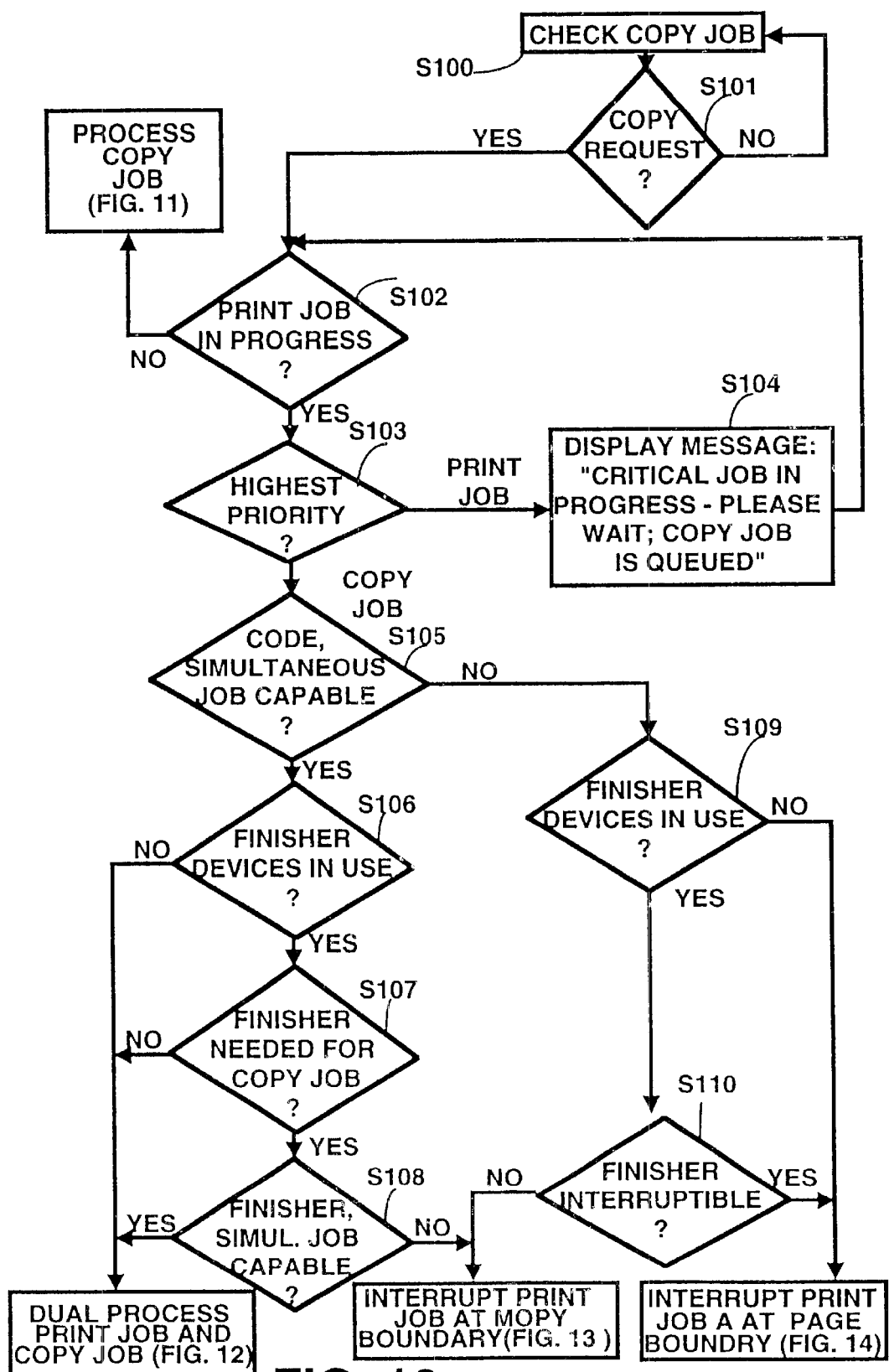
FIGS. 10–15 together form a flowchart illustrating the steps undertaken by the present invention in interrupting a print job to print a copy job.

As illustrated in FIG. 10, the copy processor periodically checks for state changes from the copy job sensor (Steps "S100" and "S101"). A state change reflects a request by a walk-up user to make a copy. Such state changes are sensed by the sensor, by key presses (e.g., hard keys from keypad and/or touch screen display) and changes in operating status of image forming device and accessory device.

The copy processor, before processing the copy job, must first determine if enough resources are available to process the copy job. The copy job may be started using resources tucked away or if enough resources are not available, the resources may be readjusted by moving RAM resources to the hard disk.

The copy processor then determines if a print job is currently in progress (Step "S102"). If no print job is currently in process, the copy job is immediately processed (refer to FIG. 11), thereby making a copy of the user's submitted document for the user, said copy outputted to an output bin.

If a print job is currently in process, the copy processor determines whether the copy job has a higher priority than the print job (Step "S103"). Priority of a print job can be set by default or through parameters administered by the printer job host. As such, a walk-up copier user may be given priority over all print jobs, or may be subject to a waiting for a higher priority job to finish, i.e. print jobs requested by individuals or departments having a higher priority than the walk-up user.

If the print job has a higher priority than the copy job, the copy job will not be allowed to interrupt the print job and will instead be queued for later processing. The copier may go ahead and pre-scan the walk-up user's entire document, storing such image data to disk to be spooled after the print job completes. Preferably, the user interface will display a message to the walk-up user regarding this denial of interruption, such as "Critical Job in Progress—Please Wait: Copy Job is Queued." (see Step "S104") At the conclusion of the print job, the copy job will return to Step "S102" where the copy processor will again determine whether a print job is in progress.

If the copy job has a higher priority than the print job, the copy processor will determine whether resources available will allow both the print job and the copy job to simultaneously run (Step "S105"). If resources are available, both the print job and the copy job could be processed at the same time and printed simultaneously through interleaving pages alternatively. Such interleaving assumes that the print job will be discharged into a different output bin than the copy job.

If a simultaneous job is able to be run then the copy processor will determine if any of the finisher devices (i.e., duplexing, stapling, gluing, binding, sorting and any other print path device that may need special consideration when interrupting a print/copy job or simultaneously printing more than one print/copy job) are currently in use by the print job (Step "S106"). If a finisher device is not in use, then the copy job and the print job can be processed simultaneously (refer to FIG. 12).

If a finisher device is in use, then the copy processor determines if the copy job requires use of the finisher (Step "S107"). If the copy job does not require the use of the finisher, then the copy job and the print job can be processed simultaneously (refer to FIG. 12).

If the copy job does require the use of the finisher, then the copy processor will determine whether the finisher is able to simultaneously "finish" both the copy job and the print job (Step "S108"). If the finisher is able to simultaneously "finish" both the copy job and the print job, then the copy job and the print job can be processed simultaneously (refer to FIG. 12). If the finisher is not able to simultaneously "finish" both the copy job and the print job, then the copy processor will interrupt the print job at a mopy boundary (refer to FIG. 13), thereby allowing the finisher to "finish" the printing job already within or on their way to the finisher, output those prints, and then accept the copy job requiring the use of the finisher. "Simultaneous" is intended to include interleaving or alternating pages, i.e., printing one page of the print job, then one page of the copy job, then one page of the print job, etc.

If the network copier does not have the resources or capability to process simultaneous print and copy jobs, the copy processor next determines if the finisher devices are in use (Step "S109"). If a finisher device is not in use, then the copy processor allows the copy job to interrupt the print job at a page boundary (refer to FIG. 14). In doing so, the page status is saved to one of the image forming device's storage devices, preferably the hard disk drive storage device. The job environment, including output tray selection to those not in use, would also be saved to one of the storage devices. The image data for the print job would then be purged from RAM and the image data for the print job located upon the hard disk drive would not be deleted. When the copy job completes, the copy processor will request this image data on the hard disk drive to be spooled to RAM to be resumed considering the page status saved previously. This allows the print job to resume printing at the page beyond the page boundary interrupted. Alternatively, the image data will not be spooled to the hard disk drive, but will instead be held in a different area of the same storage device (RAM), or spooled directly to the print engine.

Image data stored on the hard disk takes three forms. The first form is for "job retention." The second form is for "secure printing." The third form is for "print-on-demand."

The first form, for "job retention." Job retention also gives a user the option of printing to the network copier, proofing the printed document by printing a first copy and reviewing the output, and then, upon approval of the proof, causing multiple copies of the document to be printed. Such image data is stored on the hard disk until the user causes the image data to be deleted upon completion of the print job.

The second form of image data, for "secure printing," allows the user to send a print job to the network copier's hard drive to be printed later when the user approaches the network copier and inputs a security code into the copier. This allows the user to print his or her documents with the security that no other user will be able to view them. Upon printing, the image file for this secure print can be deleted.

The "print-on-demand" form allows a user to save a document to the hard drive of the network copier to be printed upon demand at a later time. This allows the user to save commonly used forms to the hard drive, for later printing. Such forms are not commonly deleted upon printing.

If a finisher device is in use, then the copy processor determines whether the finisher is able to be interrupted (Step "S110"). If the finisher is not able to be interrupted, then the copy job is allowed to interrupt the print job at a mopy boundary (refer to FIG. 13), such interruption at a mopy boundary being described above. If the finisher is able to be interrupted, then the copy processor allows the copy job to interrupt the print job at a page boundary (refer to FIG. 14), such interruption at a page boundary being described above.

Figure 11:
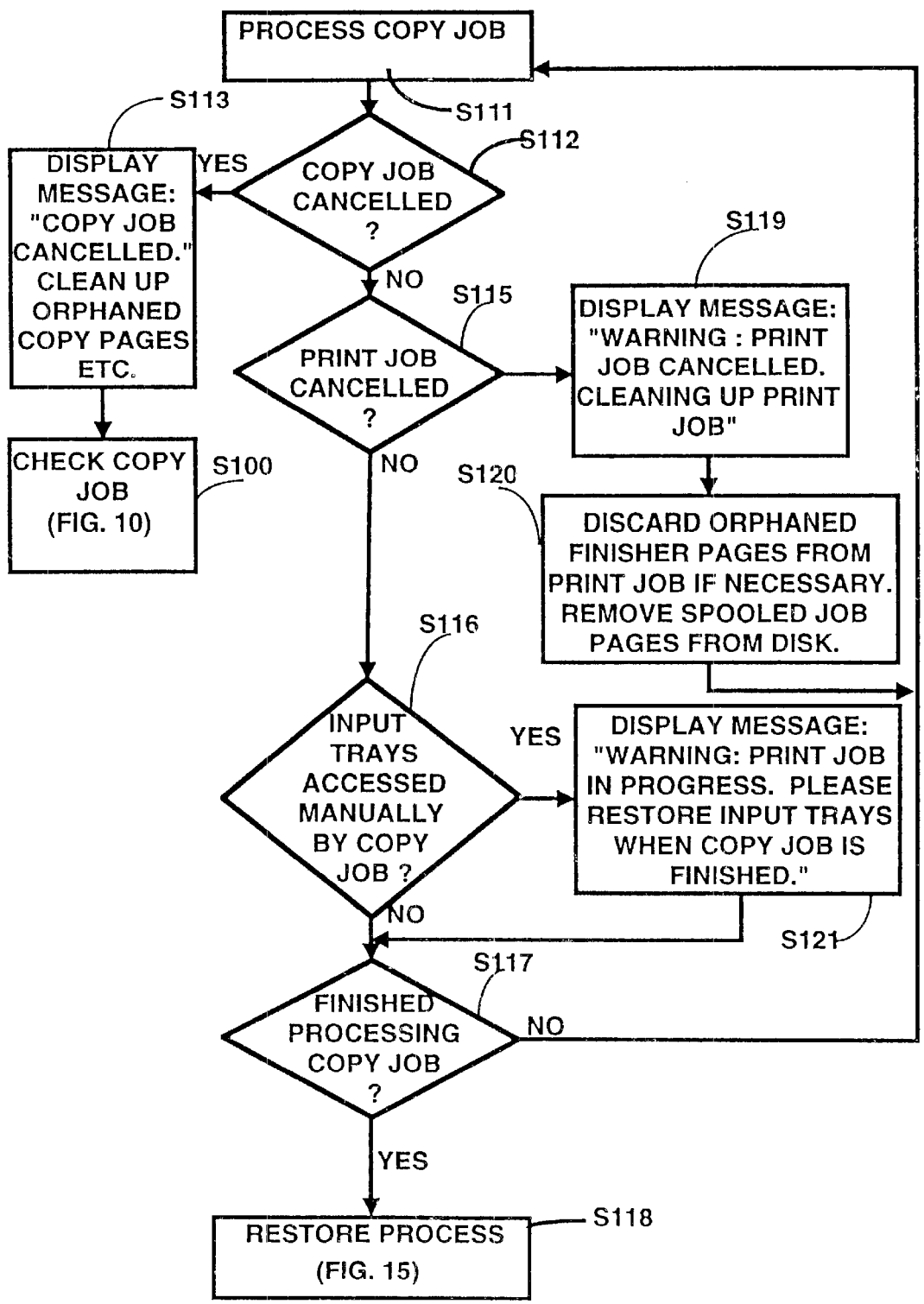

Referring to FIG. 11, the processing of a copy job is illustrated (Step "S111"). After the copy job has stopped, the copy processor determines whether the "stop" of the copy job was cancellation of the copy job (Step "S112"). If the copy job was cancelled, then any orphaned copy pages, if any, are "cleaned up" by being discharged into an output bin and preferably a message is displayed to the user informing the user of the status of the copy job, such as "Copy Job Cancelled." (see Step "S113"). The copy processor would then proceed to the initial step, Step "S100," discussed infra, FIG. 10.

If the copy job was not cancelled, then the copy processor determines whether a print job was cancelled (Step "S115"). If a print job was cancelled, the copy processor would clean up the print job by discharging any orphaned print pages, including pages within the finisher into an output bin, and would remove spooled jobs pages from the hard disk drive storage device. Preferably, the copy processor would cause to be displayed a message to the user regarding the clean up, for instance "Warning: Print Job Cancelled. Cleaning up Print Job." When such clean up is complete, the process returns to Step "S111."

If a print job was not cancelled, then the copy processor checks to determine whether the network copier's input trays were accessed (Step "S116"). Access of the input trays is probable evidence that the walk-up user may have changed the paper type, size, orientation or color. It is preferred that such change be undone before printing of print jobs can resume after the copy job is complete, otherwise the print job may be improperly completed, i.e., the remainder of the interrupted print job may be printed on a different color paper. If the copy processor determines that the input trays were accessed, then the copy processor causes to be displayed a message reminding the walk-up user to return the input trays to their original state. Such a message might be like "Warning: Print Job in Progress. Please restore input trays when copy job is finished." A similar message may also be sent to the person who sent the print job as well as the printer job host.

If the input trays have not been accessed, than the copy processor next determines whether the copy job is finished processing (Step "S117"). If the copy job is not finished processing, the copy processor returns to Step "S111" to reprocess the copy job. If the copy job has finished processing, then the copy processor restores process (Step "S118" in FIG. 11 and FIG. 15).

Figure 15:
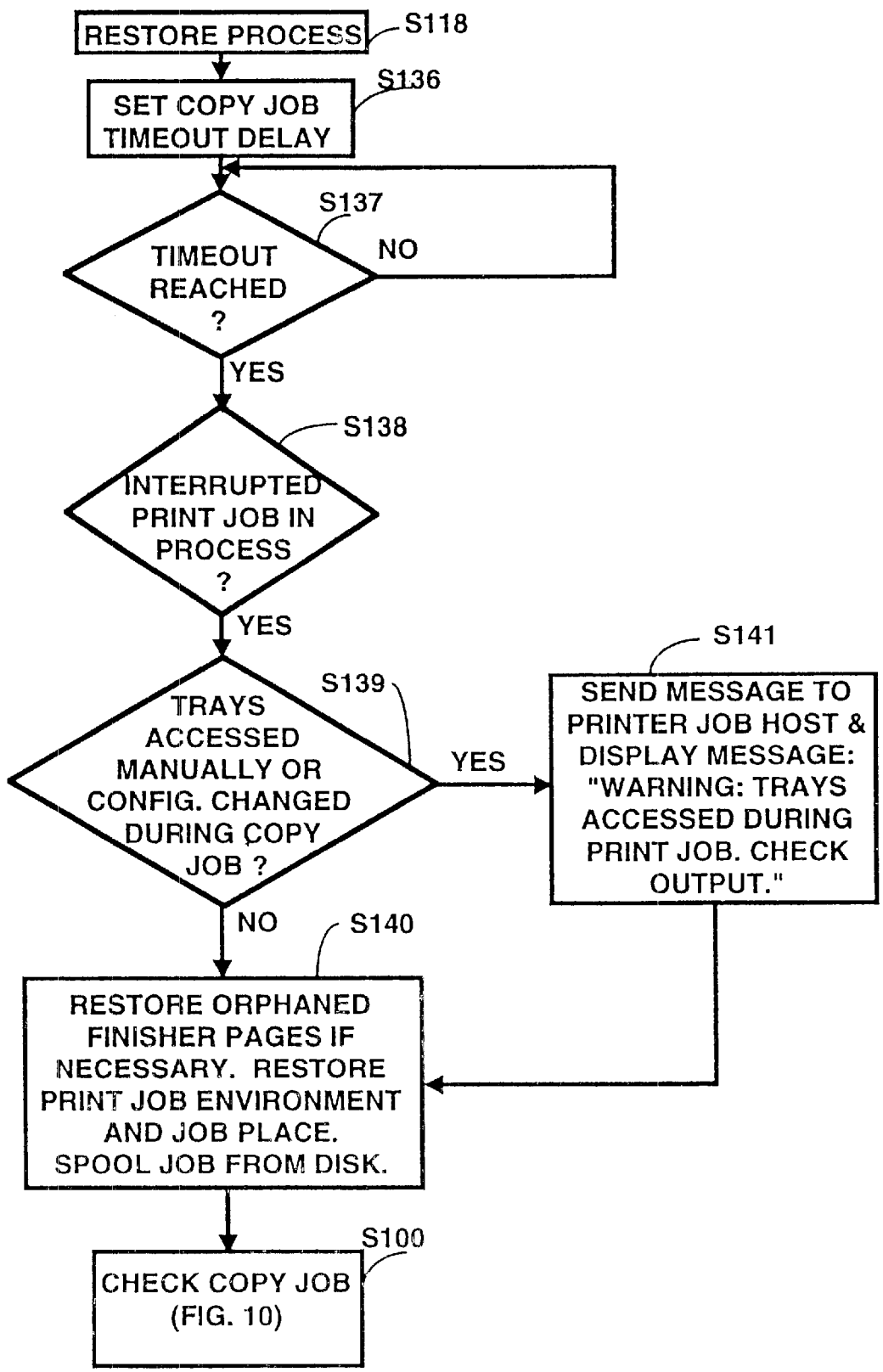

Referring to FIG. 15, upon restoring process (Step "S118"), the copy processor will set a timeout delay via the inactivity timer (Step "S136"). The inactivity timer is operated to detect inactivity from a walk-up user extending continuously on the order of preferably 15–30 seconds. This inactivity time gives the walk-up user an opportunity or window to make additional copies or perform further operations before unreserving the printer and allowing network print jobs to be printed. The copy processor will monitor the timer, waiting for the timeout to be reached (Step "S137").

When the timeout has been reached, the copy processor will check to see if a print job is being interrupted in process (Step "S138"). If not, then the copy processor will then proceed to the initial step, Step "S100," discussed infra, FIG. 10.

If a print job is being interrupted in process, the copy processor will determine whether the input trays have been accessed and whether the configuration of the input trays have been changed during the copy job (Step "S139"). If the input trays have been accessed or their configuration changed during the copy job, a message will preferably be sent to the printer job host and displayed for the walk-up user regarding such access or change (Step "S141"). An example of such a message would be "Warning: Trays accessed during print job. Check Output." A similar message may be sent to the person whose print job was interrupted.

After such a message is sent and displayed, and where the input trays have not been accessed (i.e, pulling out a paper tray) and their configuration has not been changed during the copy job, then the copy processor will cause orphaned finisher pages to be restored, if necessary, and will cause the page status, including the print job environment and job place, to be spooled from the image forming device's storage devices (Step "S140"). Upon completion of this step, the copy processor will then proceed to the initial step, Step "S100," discussed infra, FIG. 10, and will cause the print job to be finished.

Figure 12:
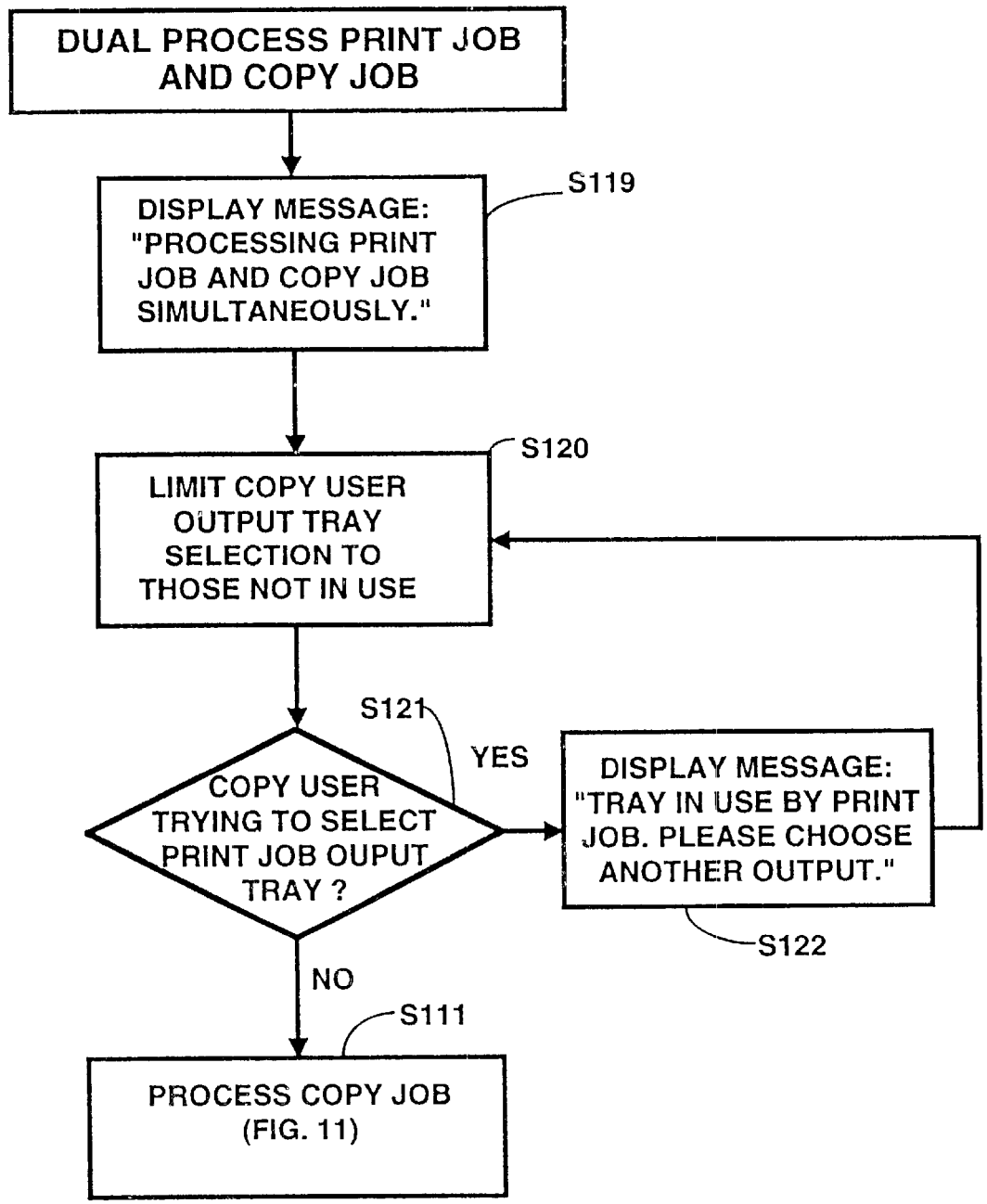

Referring to FIG. 12, the dual processing of a print job and a copy job is illustrated. Preferably, the copy processor will cause to be displayed a message to the user that such dual processing is taking place (Step "S119"). An example of such a message is "Processing Print Job and Copy Job Simultaneously." Such a message will inform the user that a print job is being printed at the same time the user's copy job is being printed.

To keep the print job output separate from the copy job output, the walk-up user will be limited to selecting an output tray not in use by the print job (Step "S120"). The copy processor checks to see if the walk-up copier user attempts to select an output tray being used by the print job (Step "S121"). If such a selection is made by the user, the copy processor will cause to be displayed a message to the user that such a selection is not allowed (Step "S122"). For instance, such a message could read "Tray in use by print job. Please choose another output." If a proper output tray is selected, the copy job will be processed, starting at Step "S111" (infra, FIG. 11).

Figure 13:
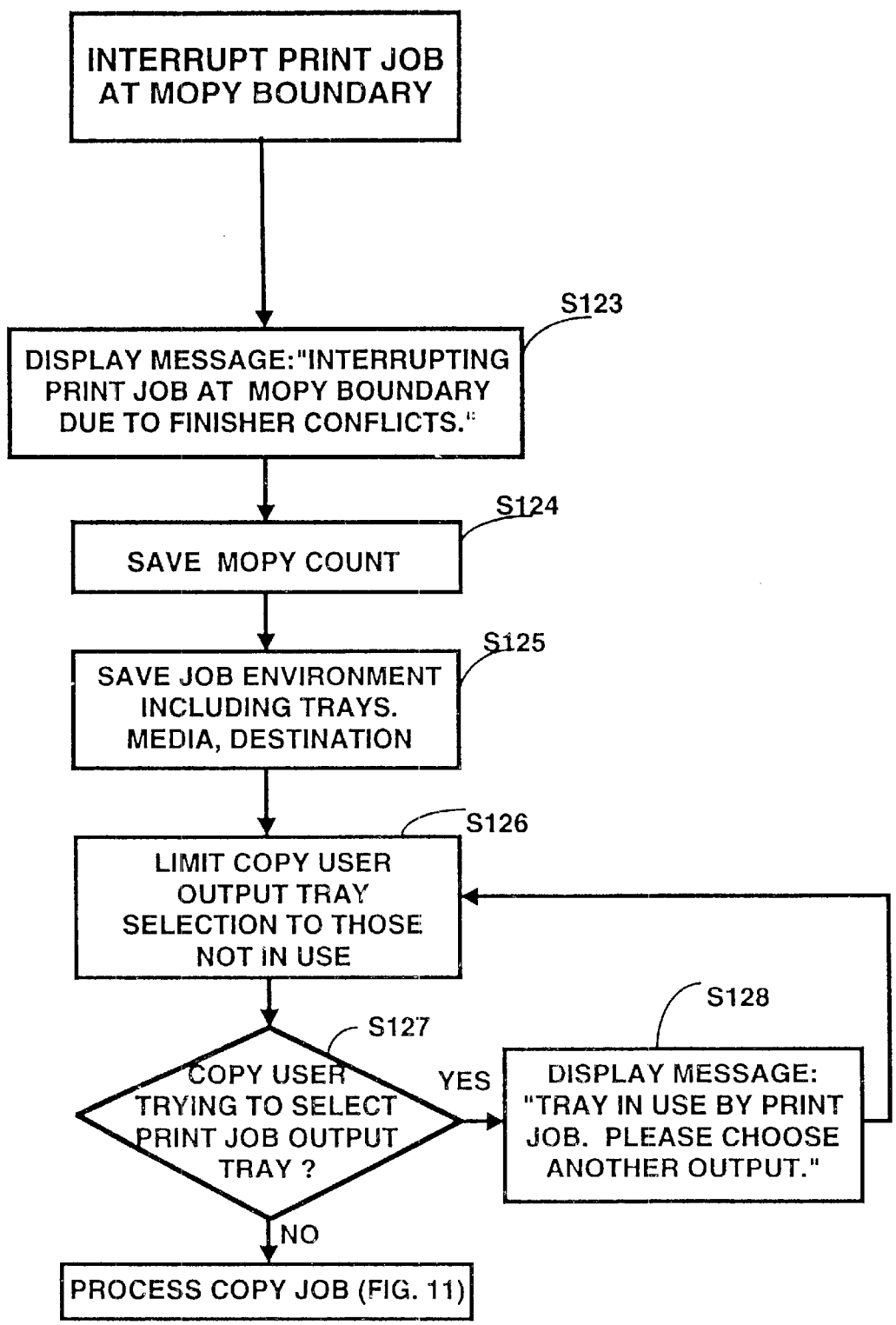

Referring to FIG. 13, interruption of a print job at a mopy boundary is illustrated. Preferably, the copy processor will cause to be displayed a message to the user that such interruption is taking place (Step "S123"). An example of such a message is "Interrupting Print Job at Mopy Boundary Due to Finisher Conflicts."

The copy processor would then save the mopy count to one of the image forming device's storage devices, preferably the hard disk drive storage device (Step "S124"). The job environment, including output tray or trays being used, would also be saved to one of the storage devices (Step "S125"). The copy processor then limits the copy user's output tray selection to output trays not currently in use by the print job (Step "S126"). The copy processor checks to see if the walk-up copier user attempts to select an output tray being used by the print job (Step "S127"). If such a selection is made by the user, the copy processor will display a message to the user that such a selection is not allowed (Step "S128"). For instance, such a message could read "Tray in use by print job. Please choose another output." If a proper output tray is selected, the copy job will be processed, starting at Step "S111" (infra, FIG. 11).

Figure 14:
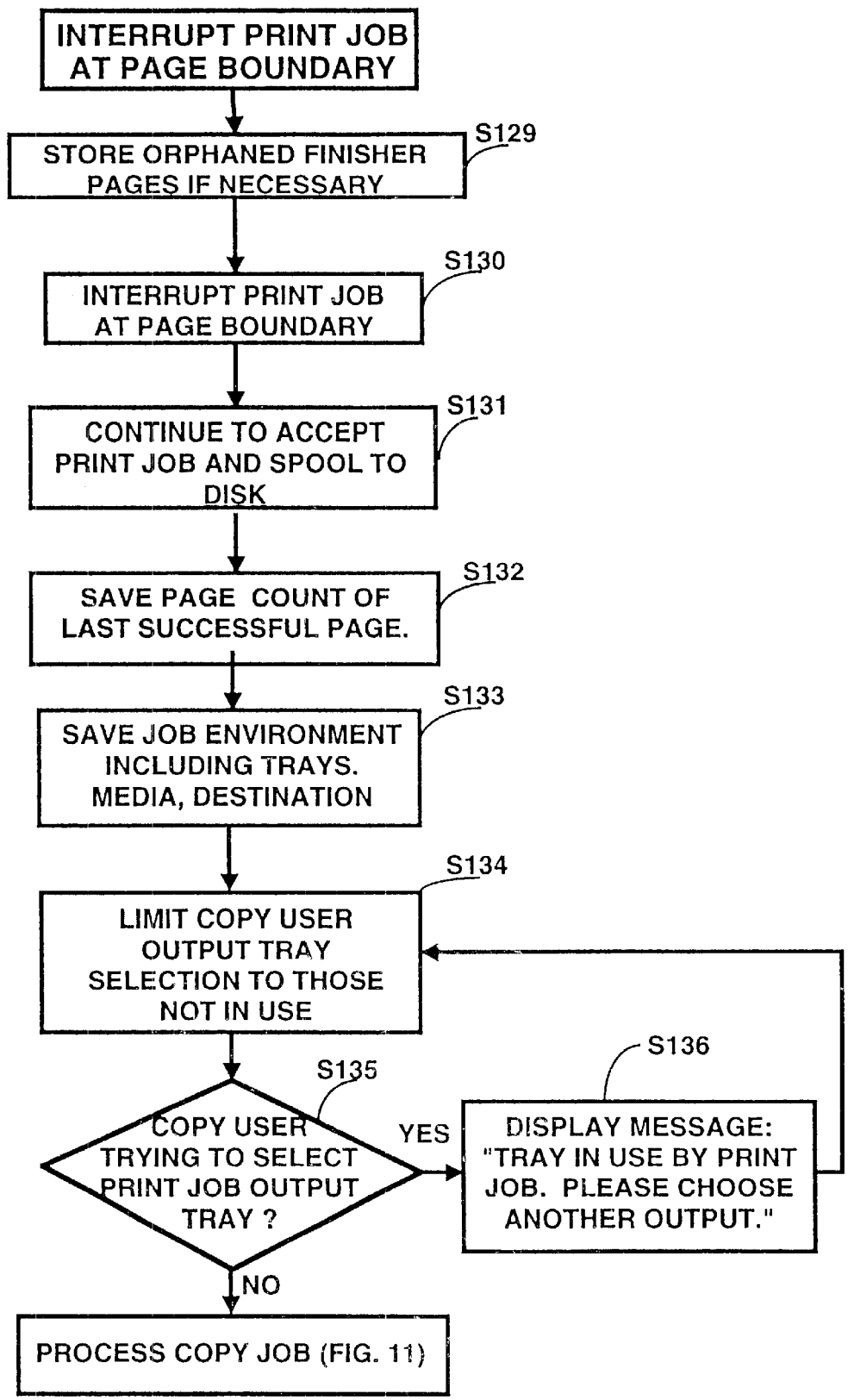

Referring to FIG. 14, interruption of a print job at a page boundary is illustrated. If orphaned finisher pages exist within the finisher, the copy processor must first cause all these orphaned finisher pages to be stored or discharged to a bin (Step "S129"). Then, the copy processor can interrupt the print job at a page boundary (Step "S130"). While the print job is being interrupted at the page boundary, the network copier preferably continues to accept print jobs from the I/O port, spooling said jobs to one of the image forming device's storage devices for later printing, preferably the hard disk drive storage device (Step "S131"). Alternatively, such storage could take place at a different area of the same storage device used for storage of PDL or image data to be printed.

Keeping the I/O port from being held off is important to keep other users from having the I/O port timing out. The copy processor must also save the page count of the last successful page completed by the image forming device to one of the image forming device's storage devices (Step "S132"). Job environment, including trays, media, and destination must also be saved to one of the image forming device's storage devices (Step "S133"). The copy processor then limits the copy user's output tray selection to output trays not in current use by the print job (Step "S134"). The copy processor checks to see if the walk-up copier user attempts to select an output tray being used by the print job (Step "S135"). If such a selection is made by the user, the copy processor will cause to be displayed a message to the user that such a selection is not allowed (Step "S136"). For instance, such a message could read "Tray in use by print job. Please choose another output." If a proper output tray is selected, the copy job will be processed, starting at Step "S111" (infra, FIG. 11).

In summary, a walk-up user is provided with several advantages with Applicants' invention. If a network print job arrives after the walk-up copier user has arrived at the copier machine, the network job will be spooled to disk to later start after the copier user is done. Additionally, if a network print job is already in progress when the user arrives, the user can interrupt the network print job in order to make their copies.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of operating a multiple function document device comprising the steps of:
   providing an image forming device having a single print engine and memory resources;
   providing a scanning device coupled with the image forming device;
   storing page description language data representing a print job from a host computer in the memory and storage resources;
   communicating the print job to the print engine, printing said print job on media, and outputting said media to a print job bin;
   sensing a request from a walk-up copier user to scan and print a document representing a copy job, said sensing occurring during said printing of the print job;
   determining whether sufficient of said memory and storage resources are available to print said print job and said copy job simultaneously; and
   if sufficient memory and storage resources are available, then proceeding to simultaneously print both said print job and said copy job by alternating between print job pages and copy job pages by repeating a pattern of printing a page of the print job and then one page of the copy job; and
   if sufficient memory and storage resources are not available, interrupting said print job at a page boundary, saving print job description language data remaining after the interrupted page boundary and saving print job page status to the memory and storage resources, forwarding the copy job to the print engine and printing the copy job on media and outputting said media to a copy job bin, and, at the end of printing of the copy job, resuming printing of the print job at the interrupted boundary page.

2. A method as in claim 1, wherein said print job bin and said copy job bin are separate output bins.

3. A method as in claim 1, further comprising, after determining that sufficient memory and storage resources are available to print both the print job and the copy job simultaneously, the steps of determining that a finishing device is not in use on the print job, then proceeding with said simultaneous printing of both said print job and said copy job.

4. A method as in claim 1, further comprising, after determining that sufficient memory and storage resources are available to print both the print job and the copy job simultaneously, the steps of determining that a finishing device is in use on the print job and not needed for the copy job, and proceeding with said simultaneous printing of the print job and the copy job.

5. A method as in claim 1, further comprising, after determining that sufficient memory and storage resources are available to print both the print job and the copy job simultaneously, the steps of determining that a finishing device is in use on the print job and also needed for the copy job, determining that said finishing device is usable on both the print job and the copy job during said simultaneous printing of the print job and the copy job, and proceeding with said simultaneous printing of the print job and the copy job while also finishing both the print job and the copy job with the finishing device.

6. A method as in claim 1, wherein the step of proceeding to simultaneously print both said print job and said copy job further comprises displaying a message that said print job and said copy job are being printed simultaneously, and limiting selection of the copy job output bin by the walk-up copier user to not be the print job output bin.

7. A method as in claim 1, further comprising, after determining that sufficient memory and storage resources are not available to print both the print job and the copy job simultaneously, the steps of determining that a finishing device is not in use on the print job, then proceeding with the print job until a page boundary and interrupting the print job at the page boundary to print the copy job.

8. A method as in claim 1, further comprising, after determining that sufficient memory and storage resources are not available to print both the print job and the copy job simultaneously, the steps of determining that a finishing device is in use on the print job and that the finishing device is interruptible, then proceeding with the print job until a page boundary and interrupting the print job at the page boundary to print the copy job.

9. A method as in claim 8, wherein the step of interrupting the print job at the page boundary further comprises the steps of storing orphaned finishing device pages, limiting copy job output bin selection by the walk-up copier user to not be the print job output bin, and, if a walk-up copier user attempts to select the print job output bin as the copy job output bin, displaying a message that another output bin must be selected.

10. A method as in claim 1, wherein said print job is interrupted at a page boundary and the copy job is printed, the method further comprising, at the end of said printing of the coy job, the steps of setting a copy job timeout delay and scanning and printing a second copy job requested by the walk-up copier user, before resuming printing of the print job at the interrupted boundary page, if the walk-up copier user requests the second copy job before the timeout delay times out.

11. A method as in claim 1, wherein said print job is interrupted at a page boundary and the copy job is printed, the method further comprising, at the end of said printing of the coy job, the steps of setting a copy job timeout delay and allowing the timeout delay to time out before resuming printing of the print job.

12. A method of operating a multiple function document device comprising the steps of:
    providing an image forming device having a single print engine and memory and storage resources;
    providing a scanning device coupled with the image forming device;
    storing page description language data representing a print job from a host computer in a first portion of the memory and storage resources;
    communicating the print job to the print engine, printing said print job on media, and outputting said media to a print job bin;
    sensing a request from a walk-up copier user to scan and print a document representing a copy job, said sensing occurring during said printing of the print job;
    determining whether a finishing device is in use on the print job and whether the finishing device is interruptible; and
    if the finishing device is in use on the print job and is not interruptible, then proceeding with the print job until a mopy boundary and interrupting the print job at the mopy boundary, then printing the copy job and, when printing of the copy job is finished, resuming the print job at the interrupted mopy boundary; and
    if the finishing device is in use on the print job and is interruptible, then proceeding with the print job until a page boundary and interrupting the print job at the page boundary, then printing the copy job and, when printing of the copy job is finished, resuming the print job at the interrupted page boundary.

13. A method as in claim 12, further comprising, after the copy job is finished, determining that input media trays have been manually accessed during the copy job and displaying a message that trays have been accessed.

14. A method as in claim 12, further comprising, prior to interrupting the print job, the step of determining that sufficient memory and storage resources are not available to print both the print job and the copy job simultaneously.

15. A method of operating a multiple function document device comprising the steps of:
    providing an image forming device having a single print engine and memory and storage resources;
    providing a scanning device coupled with the image forming device;
    storing page description language data representing a print job from a host computer in a first portion of the memory and storage resources;
    communicating the print job to the print engine, printing said print job on media, and outputting said media to a print job bin;
    sensing a request from a walk-up copier user to scan and print a document representing a copy job, said sensing occurring during said printing of the print job;
    determining whether a finishing device is in use on the print job and whether the finishing device is needed on the copy job, and, if the finishing device is in use on the print job and is needed on the copy job, then determining whether the finishing device is usable during simultaneous printing of both the print job and the copy by repeatedly alternating between printing a copy job page and printing a print job page; and
    if the finishing device is not usable during said simultaneous printing, then proceeding with the print job until a mopy boundary and interrupting the print job at the mopy boundary, then printing the copy job and, when printing of the copy job is finished, resuming the print job at the interrupted mopy boundary; and
    if the finishing device is usable during said simultaneous printing, then proceeding to simultaneously print both said print job and said copy job.

16. A method as in claim 15, further comprising, after the step of interrupting the print job at a mopy boundary and then printing the copy job, the step of determining that input media trays have been manually accessed during the copy job and displaying a message that trays have been accessed.

17. A method as in claim 16, further comprising, prior to the step of proceeding to simultaneously print both said print job and said copy job, the step of determining that sufficient memory and storage resources are available to print both the print job and the copy job simultaneously.

18. A multiple function document device, comprising:
    a printer configured to receive data from a host computer representing a print job, said printer having a single print engine data on media and having memory and storage resources;
    a scanner operatively coupled with the printer and configured to receive data representing a copy job submitted by a walk-up user;
    wherein said printer and said scanner are selectively operative in a print mode, a copy mode, and a simultaneous print and copy mode wherein the print engine repeatedly alternates between printing a print job page and a copy job page;

means for determining whether sufficient of said memory and storage resources are available for said simultaneous print and copy mode; and means for determining whether a finishing device is in use on the print job and whether the finishing device is needed for the copy job; and a user interface comprising a sensor associated with one of the printer and the scanner and accessible by the walk-up user, said sensor operative to detect submission of a copy job to the scanner by the walk-up user;

a communications mechanism coupled with the printer and the scanner, said communications mechanism operative to automatically configure the printer and the scanner for operation in one of said copy mode, print mode, and simultaneous print and copy mode, in response to said means for determining whether sufficient of said memory and storage resources are available and in response to said means for determining whether a finishing device is in use and whether the finishing device is needed for the copy job, wherein:

if memory and storage resources are determined to be available for simultaneous print and copy mode and the finishing device is determined to be in use on the print job and not needed on the copy job, actuation of the sensor allows simultaneous print and copy mode; and if memory and storage resources are determined to not be available for simultaneous print and copy mode and the finishing device is determined to not be in use on the print job, actuation of the sensor allows interruption of print mode at a page boundary of the print job to print the copy job, wherein the copy job is printed prior to resumption of print mode.

* * * * *